United States Patent
Yang et al.

(10) Patent No.: US 10,805,910 B2
(45) Date of Patent: Oct. 13, 2020

(54) METHOD AND APPARATUS FOR SENDING UPLINK CONTROL INFORMATION

(71) Applicant: ZTE CORPORATION, Shenzhen, Guangdong (CN)

(72) Inventors: Weiwei Yang, Shenzhen (CN); Bo Dai, Shenzhen (CN); Chunli Liang, Shenzhen (CN); Shuqiang Xia, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 204 days.

(21) Appl. No.: 15/748,303

(22) PCT Filed: Jun. 6, 2016

(86) PCT No.: PCT/CN2016/085007
§ 371 (c)(1),
(2) Date: Apr. 5, 2018

(87) PCT Pub. No.: WO2017/028606
PCT Pub. Date: Feb. 23, 2017

(65) Prior Publication Data
US 2018/0220413 A1     Aug. 2, 2018

(30) Foreign Application Priority Data

Aug. 14, 2015   (CN) .......................... 2015 1 0502387
Nov. 6, 2015    (CN) .......................... 2015 1 0753140

(51) Int. Cl.
H04W 72/04    (2009.01)
H04L 5/00     (2006.01)
(Continued)

(52) U.S. Cl.
CPC ....... *H04W 72/0413* (2013.01); *H04L 1/0073* (2013.01); *H04L 5/001* (2013.01);
(Continued)

(58) Field of Classification Search
None
See application file for complete search history.

(56) References Cited

U.S. PATENT DOCUMENTS

2011/0268075 A1*  11/2011  Heo .................. H04L 5/0037
                                                    370/329
2012/0113831 A1*  5/2012   Pelletier ........... H04L 5/0053
                                                    370/252
(Continued)

FOREIGN PATENT DOCUMENTS

CN    102075293 A    5/2011
CN    102148655 A    8/2011
(Continued)

OTHER PUBLICATIONS

English Translation of the International Search Report in international application No. PCT/CN2016/085007, dated Sep. 1, 2016, 2 pgs.
(Continued)

*Primary Examiner* — Kenny S Lin
(74) *Attorney, Agent, or Firm* — Li & Cai Intellectual Property (USA) Office

(57) ABSTRACT

A method for sending uplink control information comprises: determining uplink control information needing to be sent; coding the uplink control information; interlacing the coded uplink control information; and sending the interlaced uplink control information over a physical uplink control channel (PUCCH).

20 Claims, 7 Drawing Sheets

(51) Int. Cl.
*H04L 1/00* (2006.01)
*H04W 72/10* (2009.01)

(52) U.S. Cl.
CPC .......... *H04L 5/0053* (2013.01); *H04L 5/0064* (2013.01); *H04L 5/0094* (2013.01); *H04W 72/10* (2013.01); *H04L 1/0071* (2013.01)

(56) References Cited

U.S. PATENT DOCUMENTS

| | | | |
|---|---|---|---|
| 2012/0155337 A1 | 6/2012 | Park | |
| 2013/0322397 A1* | 12/2013 | Lee | H04W 56/0045 370/329 |
| 2014/0369294 A1* | 12/2014 | Seo | H04W 76/10 370/329 |
| 2015/0009926 A1* | 1/2015 | Seo | H04W 72/0413 370/329 |
| 2015/0043394 A1 | 2/2015 | Lin et al. | |
| 2015/0043470 A1* | 2/2015 | Hwang | H04W 72/0413 370/329 |
| 2015/0146634 A1* | 5/2015 | Hwang | H04L 5/0057 370/329 |
| 2015/0156762 A1* | 6/2015 | Hwang | H04L 1/1671 370/311 |
| 2015/0223213 A1* | 8/2015 | Moon | H04L 5/0048 370/329 |
| 2015/0245344 A1* | 8/2015 | You | H04J 11/00 370/280 |
| 2017/0013563 A1* | 1/2017 | Yang | H04W 52/146 |
| 2017/0215172 A1* | 7/2017 | Yang | H04B 7/26 |
| 2017/0215202 A1* | 7/2017 | Yang | H04L 5/0048 |

FOREIGN PATENT DOCUMENTS

| | | |
|---|---|---|
| CN | 103891191 A | 6/2014 |
| CN | 104272630 A | 1/2015 |
| CN | 104426637 A | 3/2015 |
| KR | 20100037791 A | 4/2010 |
| KR | 20130109119 A | 10/2013 |
| WO | 2013139207 A1 | 9/2013 |

OTHER PUBLICATIONS

English Translation of the Written Opinion of the International Search Authority in international application No. PCT/CN2016/085007, dated Sep. 1, 2016, 4 pgs.

* cited by examiner

METHOD AND APPARATUS FOR SENDING UPLINK CONTROL INFORMATION

TECHNICAL FIELD

The present disclosure relates to, but not limited to the technical field of communications, and in particular to a method and apparatus for sending Uplink Control Information (UCI).

BACKGROUND

Radio frames in a Long Term Evolution (LTE) system and an LTE-Advanced (LTE-A) system include frame structures adopting a Frequency Division Duplex (FDD) mode and a Time Division Duplex (TDD) mode. FIG. 1 is a schematic diagram of a frame structure in an LTE/LTE-A FDD system in the related art. As shown in FIG. 1, a radio frame of 10 ms is formed by 20 timeslots of 0.5 ms, numbered as 0 to 19, and timeslots 2i and 2i+1 form a subframe i of 1 ms. FIG. 2 is a schematic diagram of a frame structure in an LTE/LTE-A TDD system in the related art. A radio frame of which the period $T_f$ is 10 ms is formed by two half frames of 5 ms, each of the half frames including five subframes of 1 ms. Timeslots 2i and 2i+1 form a subframe i of 1 ms, where $T_{slot}$ is representative of a timeslot duration, $T_s$ is representative of an elementary time unit, DwPTS is representative of a downlink pilot timeslot, GP is representative of a guard period, and UpPTS is representative of an uplink pilot timeslot.

In the LTE system, multiple Physical Uplink Control Channel (PUCCH) formats, including a PUCCH format 1/1a/1b and a PUCCH format 2/2a/2b, are defined, wherein the format 1 is used to send a Scheduling Request (SR) signal of a User Equipment (UE), the format 1a is used to feed back 1-bit Acknowledgement (ACK)/Negative Acknowledgment (NACK) response message, and the format 1b is used to feed back a 2-bit ACK/NACK response message; and the format 2 is used to send a downlink Channel Status Indicator (CSI), the format 2a is used to send a CSI and a 1-bit ACK/NACK response message, and the format 2b is used to send a CSI and a 2-bit ACK/NACK response message.

Compared with the LTE system, the LTE-A system is significantly characterized in that a carrier aggregation technology is introduced into the LTE-A system, that is to say, bandwidths of the LTE system are aggregated to obtain a larger bandwidth. In the carrier aggregation-introduced LTE-A system, an aggregated carrier is referred to as a Component Carrier (CC) and also referred to as a Serving Cell (SC). Meanwhile, the LTE-A system also proposes concepts of a Primary Component Carrier/Cell (PCC/PCell) and a Secondary Component Carrier/Cell (SCC/SCell). The carrier-aggregated system includes at least one Primary Cell (PCell) and secondary cells, wherein the PCell is in an activated state all the time, and it is stipulated that a PUCCH is transmitted only over the PCell.

Under the LTE-A carrier aggregation system, two sending modes are defined for Hybrid Automatic Repeat request Acknowledgment (HARQ-ACK): a mode of PUCCH format 1b with channel selection and a mode of PUCCH format 3. If a UE configured with multiple SCs can support aggregation of at most two SCs, the UE will send HARQ-ACK in the mode of PUCCH format 1b with channel selection. If the UE can support aggregation of more than two SCs, a base station will configure, via high-layer signaling, whether the UE sends HARQ-ACK information in the mode of PUCCH format 1b with channel selection or the mode of PUCCH format 3.

In an FDD system, the PUCCH format 3 adopts a Reed-Muller (RM) coding mode, supporting transmission of at most 10 bits of HARQ-ACK. In a TDD system, the PUCCH format 3 adopts a dual-RM coding mode, supporting transmission of at most 20 bits of HARQ-ACK. It is also stipulated, in the TDD system, that when the number of bits of HARQ-ACK required to be sent is greater than 20, the HARQ-ACK required to be sent is spatially bound and then sent by using the PUCCH format 3. When it is necessary to send HARQ-ACK and CSIs at the same time, a current system stipulates that if supported CSIs and HARQ-ACK (including SRs) are smaller than a maximum load of the PUCCH format 3, the HARQ-ACK (including SRs) and the CSIs are transmitted at the same time, and otherwise, only the HARQ-ACK (including SRs) is sent. The LTE-A system does not support to send CSIs of multiple SCs over the same subframe at the same time.

In the related art, a PUCCH format 3 supports to send at most 20 bits of HARQ-ACK. In following versions, a carrier aggregation technology for at most 32 SCs is supported. A PUCCH format in the related art cannot send UCI corresponding to 32 SCs. Therefore, a new PUCCH format is introduced to send UCI. How to send UCI by using a new PUCCH format is a problem to be urgently solved.

SUMMARY

The following is a brief introduction for the subject matter described herein in detail. The brief introduction is not intended to restrict the scope of protection of the claims.

The disclosure provides a method for sending UCI, capable of solving the problem about sending UCI during aggregation of more than five SCs.

The embodiment of the disclosure provides a method for sending UCI. The method includes the steps as follows.

UCI required to be sent is determined. The UCI is coded.

The coded UCI is interlaced.

The interlaced UCI is sent over a PUCCH.

Alternatively, the step that UCI required to be sent is determined includes the sub-step as follows.

UCI required to be sent is determined according to at least one of the following rules.

UCI required to be sent is determined according to the number of SCs.

UCI required to be sent is determined according to the number of bits of UCI.

UCI required to be sent is determined according to a PUCCH format capacity.

UCI required to be sent is determined according to a code rate corresponding to UCI.

Alternatively, the rule that UCI required to be sent is determined according to the number of SCs includes the sub-rules as follows.

When the number N of SCs with UCI required to be sent is not greater than a preset number X of SCs with UCI available for sending, UCI of N SCs is sent.

When the number N of SCs with UCI required to be sent is greater than a preset number X of SCs with UCI available for sending, UCI of X SCs is sent.

Alternatively, the rule that UCI required to be sent is determined according to the number of bits of UCI includes the sub-rules as follows.

When the number of bits M1 of UCI required to be sent is not greater than a preset number of bits Y1 of UCI available for sending, M1-bit UCI is sent.

When the number of bits M1 of UCI required to be sent is greater than a preset number of bits Y1 of UCI available for sending, Y1-bit UCI is sent.

Alternatively, the rule that UCI required to be sent is determined according to a PUCCH format capacity includes the sub-rules as follows.

When the number of bits M2 of UCI required to be sent is not greater than a maximum number of bits Y2 carried by a PUCCH format, M2-bit UCI is sent.

When the number of bits M2 of UCI required to be sent is greater than a maximum number of bits carried by a PUCCH format, Y2-bit UCI is sent.

Alternatively, the rule that UCI required to be sent is determined according to a code rate corresponding to UCI includes the sub-rules as follows.

When a code rate P corresponding to UCI required to be sent is not greater than a preset code rate Z, the UCI is directly sent.

When a code rate P corresponding to UCI required to be sent is greater than a preset code rate Z, part of UCI is deleted until the code rate is smaller than the preset code rate Z.

Alternatively, the step that UCI required to be sent is determined includes the sub-step as follows.

When the UCI is HARQ-ACK information, the UCI is sorted according to a Downlink Assignment Index (DAI) field in Downlink Control Information (DCI), the size of the DAI field being configured via high-layer signaling, or the size of the DAI field being a pre-appointed fixed value.

Alternatively, DAI values are ascending sequentially according to an SC index, or ascending sequentially according to an SC attribute and an SC index.

Alternatively, the SC attribute includes an SC (licensed carrier) on a licensed spectrum or an SC (unlicensed carrier) on an unlicensed spectrum by distinguishing spectra where SCs are located.

Alternatively, the step that the UCI is coded includes the sub-step as follows.

The UCI required to be sent is cascaded and coded to obtain a UCI coding sequence.

Alternatively, the method may further include the steps as follows.

Priorities of the UCI are acquired.

In the method, the step that the UCI is cascaded includes the sub-step as follows.

The UCI is cascaded according to an SC index corresponding to the UCI, and/or the type of the UCI, and/or the priorities of the UCI.

Alternatively, the step that the UCI is cascaded according to an SC index corresponding to the UCI, and/or the type of the UCI, and/or the priorities of the UCI includes the sub-step as follows.

The UCI is cascaded according to the type of the UCI and then according to the SC index corresponding to the UCI; or, the UCI is cascaded according to the priorities of the UCI and then according to the SC index corresponding to the UCI; or, the UCI is cascaded according to the type of the UCI, according to the priorities of the UCI, and then according to the SC index corresponding to the UCI.

Alternatively, after the UCI is cascaded, the method may further include the steps as follows.

Cyclic Redundancy Check (CRC) is added to the cascaded UCI; or,

CRC is added to the cascaded UCI corresponding to each priority.

Alternatively, the step that the coded UCI is interlaced includes the sub-step as follows.

A UCI coding modulation sequence is determined according to a modulation mode corresponding to a PUCCH and the UCI coding sequence, and the UCI coding modulation sequence is written into a matrix by row and then column or by column and then row.

Alternatively, the method may further include the steps as follows.

Priorities of the UCI are acquired.

In the method, the step that the UCI is coded includes the sub-step as follows.

The UCI corresponding to each priority is cascaded and independently coded to obtain a coding sequence corresponding to each priority.

Alternatively, the method may further include the steps as follows.

The length of the coding sequence is determined according to at least one of the following information:

the number of bits of the UCI, time frequency resource size occupied by PUCCH format, and a high-layer configuration offset.

Alternatively, the method may further include the steps as follows.

CRC is added to the cascaded UCI corresponding to each priority.

Alternatively, the step that the coded UCI is interlaced includes the sub-steps as follows.

A UCI coding modulation sequence corresponding to each priority is determined according to a modulation mode corresponding to a PUCCH and a coding sequence corresponding to each priority.

The coding modulation sequences are cascaded in a descending order of priorities, and the cascaded coding modulation sequences are written into a matrix by row and then column.

Or, the coding modulation sequences are cascaded according to the type of the UCI and then cascaded in a descending order of priorities, and the cascaded coding modulation sequences are written into a matrix by row and then column.

Alternatively, the step that the coded UCI is interlaced includes the sub-steps as follows.

A UCI coding modulation sequence corresponding to each priority is determined according to a modulation mode corresponding to a PUCCH and a coding sequence corresponding to each priority.

The high-priority UCI coding modulation sequences are written into fixed columns of a matrix, and the low-priority UCI coding modulation sequences are written into the matrix by row and then column.

Alternatively, the size of the matrix is associated with the time frequency resource size occupied by the PUCCH format.

Alternatively, the step that the interlaced UCI is sent over a PUCCH includes the sub-step as follows.

The interlaced UCI is read out from the matrix by column and then row, and sent over the PUCCH.

Alternatively, for non-periodic CSI trigger, the method may further include the steps as follows.

Aggregated SCs are grouped, and a non-periodic CSI SC set is configured by high-layer signaling based on grouping.

Alternatively, the UCI is CSI information or is CSI information and HARQ-ACK information.

Alternatively, the method may further include the step as follows.

Priorities of the UCI are determined. The step includes the following sub-steps.

The CSI information contains two priorities, wherein the CSI information is divided into a first class of CSI information and a second class of CSI information, the first class of CSI information is determined as first-priority UCI, and the second class of CSI information is determined as second-priority UCI, wherein the priority of the first-priority UCI is higher than that of the second-priority UCI.

Or, the CSI information has the same priority.

Alternatively, when the UCI is CSI information and HARQ-ACK information, the step that priorities of the UCI are determined may further include the sub-steps as follows.

The priority of the HARQ-ACK information is higher than the priorities of all CSI information, or the priority of the HARQ-ACK information is the same as that of the first class of CSI information.

Alternatively, when the UCI includes HARQ-ACK information and CSI information, the step that the interlaced UCI is sent over a PUCCH includes the sub-step as follows.

A PUCCH resource for sending the UCI is determined, and the UCI is sent by using the determined PUCCH resource.

Herein, the step that a PUCCH resource for sending the UCI is determined and the UCI is sent by using the determined PUCCH resource includes the sub-step as follows.

PUCCH resources capable of supporting UCI transmission are determined, a PUCCH resource for UCI transmission is determined according to the PUCCH resources capable of supporting UCI transmission, and the UCI is sent by using the PUCCH resource.

Alternatively, the step that PUCCH resources capable of supporting UCI transmission are determined includes the sub-step as follows.

PUCCH resources capable of supporting UCI transmission are determined according to at least one of the following rules.

PUCCH resources capable of supporting UCI transmission are determined according to PUCCH resources for HARQ-ACK information transmission.

PUCCH resources capable of supporting UCI transmission are determined according to PUCCH resources for CSI transmission.

PUCCH resources capable of supporting UCI transmission are determined according to parameters configured by high-layer signaling for supporting simultaneous transmission of HARQ-ACK information and CSI information.

Alternatively, the step that a PUCCH resource for UCI transmission is determined includes the sub-step as follows.

A PUCCH resource for UCI transmission is determined according to at least one of the following manners.

A PUCCH resource for UCI transmission is determined at least according to loads of PUCCH resources capable of supporting UCI transmission, or a fixed resource is taken as a PUCCH resource for UCI transmission.

Or, a PUCCH format for UCI transmission is determined, and a PUCCH resource corresponding to the PUCCH format for UCI transmission is determined.

Alternatively, the manner that a PUCCH resource for UCI transmission is determined according to loads of PUCCH resources capable of supporting UCI transmission includes the following sub-manners.

A PUCCH resource corresponding to a maximum supportable load in PUCCH resources capable of supporting UCI transmission is determined as a PUCCH resource for UCI transmission.

Or, a PUCCH resource corresponding to a minimum supportable load in PUCCH resources capable of supporting UCI transmission is determined as a PUCCH resource for UCI transmission.

Or, a minimum PUCCH resource corresponding to a minimum supportable load smaller than a maximum supportable load value in loads of UCI required to be sent in PUCCH resources capable of supporting UCI transmission is determined as a PUCCH resource for UCI transmission.

Herein, when it is determined that a PUCCH resource for UCI transmission corresponds to more than one PUCCH resource, a PUCCH resource corresponding to HARQ-ACK is selected, or, a PUCCH resource corresponding to most Physical Resource Blocks (PRBs) is selected, or, a PUCCH resource corresponding to CSI is selected.

Alternatively, the fixed resource includes: a PUCCH resource corresponding to HARQ-ACK, or a PUCCH resource corresponding to CSI.

Herein, when it is determined that a PUCCH resource for UCI transmission corresponds to more than one PUCCH resource, a PUCCH resource corresponding to most PRBs is selected, or, a PUCCH resource corresponding to a minimum supportable load in PUCCH resources corresponding to supportable loads greater than loads of UCI required to be sent is selected; or, a PUCCH resource corresponding to a maximum supportable load is selected, or, a PUCCH resource corresponding to a minimum supportable load is selected; or, a PUCCH resource corresponding to most PRBs is selected.

Alternatively, the step that PUCCH resources capable of supporting UCI transmission are determined includes the sub-step as follows.

A PUCCH format for UCI transmission is determined, and a PUCCH resource corresponding to the PUCCH format for UCI transmission is determined.

The PUCCH format for UCI transmission includes: a PUCCH format capable of carrying UCI with most bits in PUCCH formats capable of supporting UCI transmission; or, a PUCCH format corresponding to HARQ-ACK; or, a PUCCH format corresponding to CSI.

Alternatively, the method may further include the steps as follows.

When the determined PUCCH format for UCI transmission corresponds to a PUCCH resource, the PUCCH resource is taken as a PUCCH resource for UCI transmission.

When the PUCCH format corresponds to more than one PUCCH resource, a PUCCH resource corresponding to most PRBs is selected as a PUCCH resource corresponding to the PUCCH format; or, a PUCCH resource corresponding to HARQ-ACK is selected as a PUCCH resource corresponding to the PUCCH format; or, a maximum PUCCH resource corresponding to a maximum supportable load is selected as a PUCCH resource corresponding to the PUCCH format; or, a minimum PUCCH resource corresponding to a maximum supportable load is selected as a PUCCH resource corresponding to the PUCCH format.

Alternatively, the step that the interlaced UCI is sent over a PUCCH includes the sub-step as follows.

When resources corresponding to the PUCCH are indicated by ACK/NACK Resource Indicator (ARI) values, a resource corresponding to the PUCCH is determined according to the latest ARI value, and the UCI is sent by using the determined PUCCH resource.

The embodiment of the disclosure also provides a computer-readable storage medium which stores a computer-executable instruction. When the computer-executable instruction is executed, the method for sending UCI is implemented.

The embodiment of the disclosure also provides an apparatus for sending UCI. The apparatus includes: a determination module, a coding module, an interlacing module and a sending module.

The determination module is configured to determine UCI required to be sent and priorities of the UCI.

The coding module is configured to code the UCI.

The interlacing module is configured to interlace the coded UCI.

The sending module is configured to send the interlaced UCI over a PUCCH.

Alternatively, the determination module is configured to determine UCI required to be sent according to at least one of the following rules.

UCI required to be sent is determined according to the number of SCs.

UCI required to be sent is determined according to the number of bits of UCI.

UCI required to be sent is determined according to a PUCCH format capacity.

UCI required to be sent is determined according to a code rate corresponding to UCI.

Alternatively, the determination module is configured to: send, when the number N of SCs with UCI required to be sent is not greater than a preset number X of SCs with UCI available for sending, UCI of N SCs; and send, when the number N of SCs with UCI required to be sent is greater than a preset number X of SCs with UCI available for sending, UCI of X SCs.

Alternatively, the determination module is configured to: send, when the number of bits M1 of UCI required to be sent is not greater than a preset number of bits Y1 of UCI available for sending, M1-bit UCI; and send, when the number of bits M1 of UCI required to be sent is greater than a preset number of bits Y1 of UCI available for sending, Y1-bit UCI.

Alternatively, the determination module is configured to: send, when the number of bits M2 of UCI required to be sent is not greater than a maximum number of bits Y2 carried by a PUCCH format, M2-bit UCI; and send, when the number of bits M2 of UCI required to be sent is greater than a maximum number of bits carried by a PUCCH format, Y2-bit UCI.

Alternatively, the determination module is configured to: directly send, when a code rate P corresponding to UCI required to be sent is not greater than a preset code rate Z, the UCI; and delete, when a code rate P corresponding to UCI required to be sent is greater than a preset code rate Z, part of UCI until the code rate is smaller than the preset code rate Z.

Alternatively, the determination module is configured to: sort, when the UCI is HARQ-ACK information, the UCI according to a DAI field in DCI, the size of the DAI field being configured via high-layer signaling, or the size of the DAI field being a pre-appointed fixed value.

Alternatively, DAI values are ascending sequentially according to an SC index, or ascending sequentially according to an SC attribute and an SC index.

Alternatively, the SC attribute includes an SC (licensed carrier) on a licensed spectrum or an SC (unlicensed carrier) on an unlicensed spectrum by distinguishing spectra where SCs are located.

Alternatively, the coding module is configured to: cascade and code the UCI required to be sent to obtain a UCI coding sequence.

Alternatively, the coding module is configured to: acquire priorities of the UCI, and cascade the UCI according to an SC index corresponding to the UCI, and/or the type of the UCI, and/or the priorities of the UCI.

Alternatively, the coding module is configured to: cascade the UCI according to the type of the UCI and then according to the SC index corresponding to the UCI; or, cascade the UCI according to the priorities of the UCI and then according to the SC index corresponding to the UCI; or, cascade the UCI according to the type of the UCI, according to the priorities of the UCI, and then according to the SC index corresponding to the UCI.

Alternatively, the coding module may be further configured to: add, after the UCI is cascaded, CRC to the cascaded UCI; or, add CRC to the cascaded UCI corresponding to each priority.

Alternatively, the interlacing module is configured to: determine a UCI coding modulation sequence according to a modulation mode corresponding to a PUCCH and the UCI coding sequence, and write the UCI coding modulation sequence into a matrix by row and then column or by column and then row.

Alternatively, the coding module is configured to: acquire priorities of the UCI, and cascade and independently code the UCI corresponding to each priority to obtain a coding sequence corresponding to each priority.

Alternatively, the coding module may be further configured to: determine the length of the coding sequence according to at least one of the following information: the number of bits of the UCI, time frequency resource size occupied by the PUCCH format, and a high-layer configuration offset.

Alternatively, the coding module may be further configured to: add CRC to the cascaded UCI corresponding to each priority.

Alternatively, the interlacing module is configured to: determine a UCI coding modulation sequence corresponding to each priority according to a modulation mode corresponding to a PUCCH and a coding sequence corresponding to each priority;

cascade the coding modulation sequences in a descending order of priorities, and write the cascaded coding modulation sequences into a matrix by row and then column;

or, cascade the coding modulation sequences according to the type of the UCI cascade the coding modulation sequences in a descending order of priorities, and write the cascaded coding modulation sequences into a matrix by row and then column.

Alternatively, the interlacing module is configured to: determine a UCI coding modulation sequence corresponding to each priority according to a modulation mode corresponding to a PUCCH and a coding sequence corresponding to each priority; and write the high-priority UCI coding modulation sequences into fixed columns of a matrix, and write the low-priority UCI coding modulation sequences into the matrix by row and then column.

Alternatively, the sending module is configured to: read out the interlaced UCI from the matrix by column and then row, and send the UCI over the PUCCH.

Alternatively, for non-periodic CSI trigger, the apparatus may further include:

a configuration module, configured to: group aggregated SCs, and configure a non-periodic CSI SC set by high-layer signaling based on grouping.

Alternatively, the apparatus may further include:

a priority determination module, configured to: determine priorities of the UCI, wherein when the UCI is CSI information, the CSI information contains two priorities, the priority determination module divides the CSI information into a first class of CSI information and a second class of CSI information;

determine the first class of CSI information as first-priority UCI, and determine the second class of CSI information as second-priority UCI, wherein the priority of the first-priority UCI is higher than that of the second-priority UCI;

or, the CSI information has the same priority.

Alternatively, when the UCI is CSI information and HARQ-ACK information, the priority determination module may be further configured to: determine that the priority of the HARQ-ACK information is higher than the priorities of all pieces of CSI information, or that the priority of the HARQ-ACK information is the same as that of the first class of CSI information.

Alternatively, when the UCI includes HARQ-ACK information and CSI information, the sending module is configured to: determine a PUCCH resource and/or format for sending the UCI, and send the UCI by using the determined PUCCH resource.

Herein, the operation that a PUCCH resource and/or format for sending the UCI is determined and the UCI is sent by using the determined PUCCH resource includes the operation as follows.

PUCCH resources capable of supporting UCI transmission are determined, a PUCCH resource for UCI transmission is determined according to the PUCCH resources capable of supporting UCI transmission, and the UCI is sent by using the PUCCH resource.

Alternatively, the sending module is configured to: determine PUCCH resources capable of supporting UCI transmission according to at least one of the following rules.

PUCCH resources capable of supporting UCI transmission are determined according to PUCCH resources for HARQ-ACK information transmission.

PUCCH resources capable of supporting UCI transmission are determined according to PUCCH resources for CSI transmission.

PUCCH resources capable of supporting UCI transmission are determined according to parameters configured by high-layer signaling for supporting simultaneous transmission of HARQ-ACK information and CSI information.

Alternatively, the sending module is configured to: determine a PUCCH resource for UCI transmission according to at least one of the following manners.

A PUCCH resource for UCI transmission is determined at least according to loads of PUCCH resources capable of supporting UCI transmission, or a fixed resource is taken as a PUCCH resource for UCI transmission.

Or, a PUCCH format for UCI transmission is determined, and a PUCCH resource corresponding to the PUCCH format for UCI transmission is determined.

Alternatively, the sending module is configured to:

determine a PUCCH resource corresponding to a maximum supportable load in PUCCH resources capable of supporting UCI transmission as a PUCCH resource for UCI transmission;

or, determine a PUCCH resource corresponding to a minimum supportable load in PUCCH resources capable of supporting UCI transmission as a PUCCH resource for UCI transmission;

or, determine a minimum PUCCH resource corresponding to a minimum supportable load smaller than a maximum supportable load value in loads of UCI required to be sent in PUCCH resources capable of supporting UCI transmission as a PUCCH resource for UCI transmission.

Herein, when it is determined that a PUCCH resource for UCI transmission corresponds to more than one PUCCH resource, a PUCCH resource corresponding to HARQ-ACK is selected as a PUCCH resource for UCI transmission, or, a PUCCH resource corresponding to most PRBs is selected as a PUCCH resource for UCI transmission, or, a PUCCH resource corresponding to CSI is selected as a PUCCH resource for UCI transmission.

Alternatively, the fixed resource includes: a PUCCH resource corresponding to HARQ-ACK, or a PUCCH resource corresponding to CSI.

The sending module is configured to: select, when it is determined that a PUCCH resource for UCI transmission corresponds to more than one PUCCH resource, a PUCCH resource corresponding to most PRBs, or, a PUCCH resource corresponding to a minimum supportable load in PUCCH resources corresponding to supportable loads greater than loads of UCI required to be sent; or, select a PUCCH resource corresponding to a maximum supportable load, or, select a PUCCH resource corresponding to a minimum supportable load; or, select a PUCCH resource corresponding to most PRBs.

Alternatively, the sending module is configured to: determine a PUCCH format for UCI transmission, and determine a PUCCH resource corresponding to the PUCCH format for UCI transmission.

The PUCCH format for UCI transmission includes: a PUCCH format capable of carrying UCI with most bits in PUCCH formats capable of supporting UCI transmission; or, a PUCCH format corresponding to HARQ-ACK; or, a PUCCH format corresponding to CSI.

Alternatively, the sending module may be further configured to: take, when the determined PUCCH format for UCI transmission corresponds to a PUCCH resource, the PUCCH resource as a PUCCH resource for UCI transmission; select, when the PUCCH format corresponds to more than one PUCCH resource, a PUCCH resource corresponding to most PRBs as a PUCCH resource corresponding to the PUCCH format; or, select a PUCCH resource corresponding to HARQ-ACK as a PUCCH resource corresponding to the PUCCH format; or, select a maximum PUCCH resource corresponding to a maximum supportable load as a PUCCH resource corresponding to the PUCCH format; or, select a minimum PUCCH resource corresponding to a maximum supportable load as a PUCCH resource corresponding to the PUCCH format.

Alternatively, the sending module is configured to: determine, when resources corresponding to the PUCCH are indicated by ARI values, a resource corresponding to the PUCCH according to the latest ARI value, and send the UCI by using the determined PUCCH resource.

The method for sending UCI provided in the embodiment of the disclosure includes: determining UCI required to be sent; coding the UCI; interlacing the coded UCI; and sending the interlaced UCI over a PUCCH. Thus, the problem about sending UCI during aggregation of more than five SCs can be solved.

After the drawings and the detailed descriptions are read and understood, other aspects may be understood.

DETAILED DESCRIPTION

The implementation of the disclosure will be described below in conjunction with the drawings. It should be noted that the embodiments in the present application and various modes in the embodiments may be combined mutually without conflicts.

In the embodiments of the disclosure, UCI required to be sent is determined; the UCI is coded; the coded UCI is interlaced; and the interlaced UCI is sent over a PUCCH.

Figure 1:
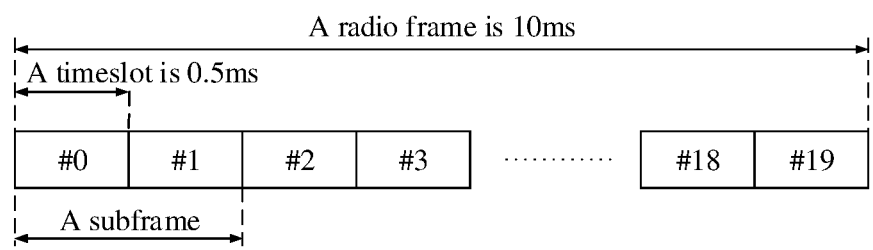
FIG. 1 is a schematic diagram of a frame structure in an LTE/LTE-A FDD system.
Figure 2:
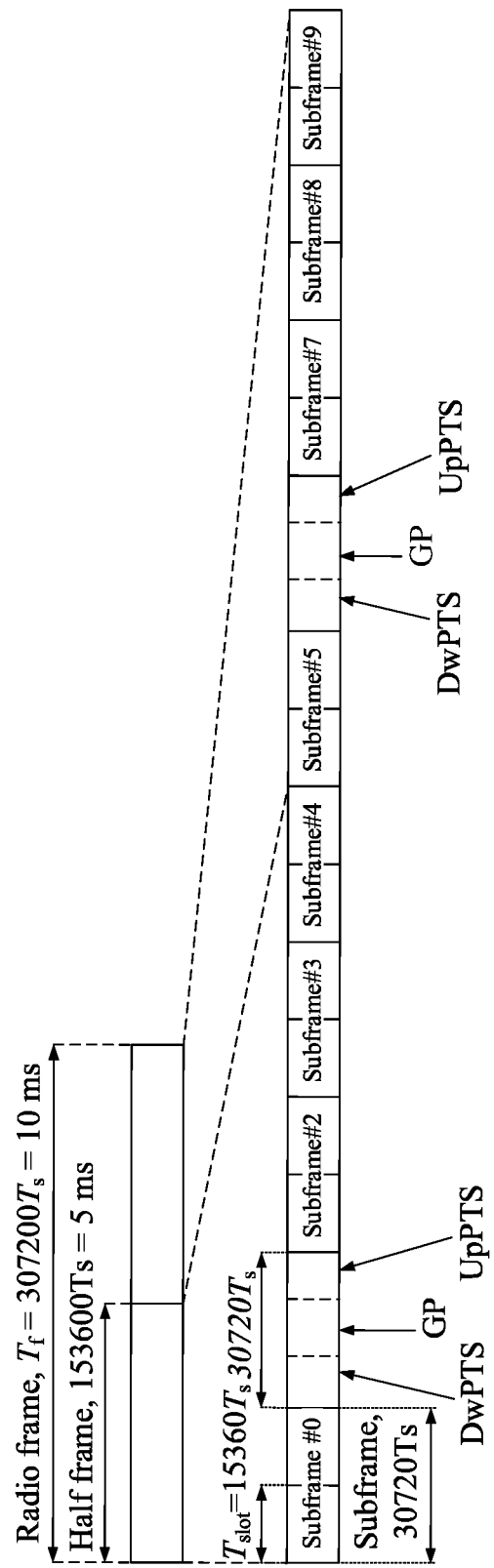
FIG. 2 is a schematic diagram of a frame structure in an LTE/LTE-A TDD system.
Figure 3:
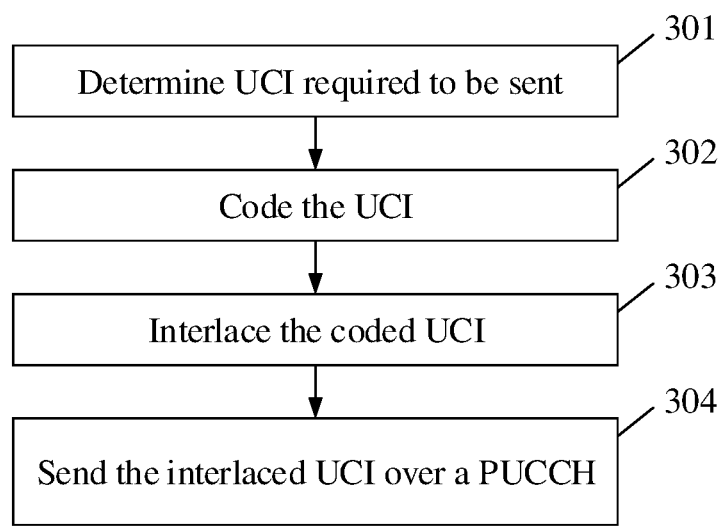
FIG. 3 is a flowchart of a method for sending UCI according to an embodiment of the disclosure.
Figure 4:
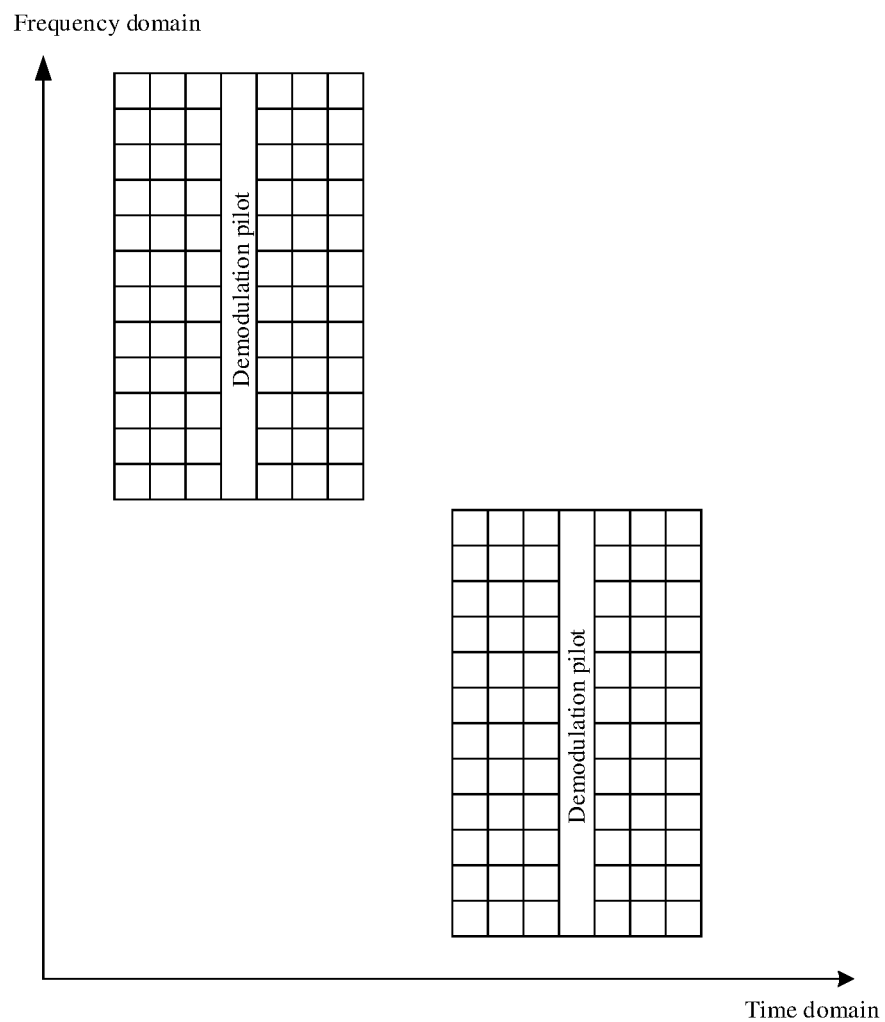
FIG. 4 is a schematic diagram of a time frequency size occupied by a PUCCH format 4 according to an embodiment of the disclosure.

The implementation of the technical solutions of the embodiments of the disclosure will be further described below in conjunction with the drawings and the embodiments in detail. FIG. 3 is a flowchart of a method for sending UCI according to an embodiment of the disclosure. In the present embodiment, the PUCCH for sending the UCI is a PUCCH format 4. FIG. 4 is a schematic diagram of a time frequency size occupied by a PUCCH format 4 according to an embodiment of the disclosure. As shown in FIG. 4, the PUCCH format 4 bears information of at most 128 bits, a corresponding modulation mode is Quadrature Phase Shift Keying (QPSK), 12 symbols are occupied on a time domain, and 12 subcarriers are occupied on a frequency domain. Sending in the PUCCH format 4 refers to: performing scrambling, modulation, transmission pre-conversion, resource mapping, generation of Single-Carrier Frequency-Division Multiple Access (SC-FDMA) symbol on a coded and interlaced sequence, and then sending.

As shown in FIG. 3, the method for sending UCI in the present embodiment includes the steps as follows.

In step 301, UCI required to be sent is determined.

In the embodiment of the disclosure, the UCI may be CSI information or may be CSI information and HARQ-ACK information.

By means of the embodiment of the disclosure, the UCI may be sent under a new PUCCH format.

Figure 5:
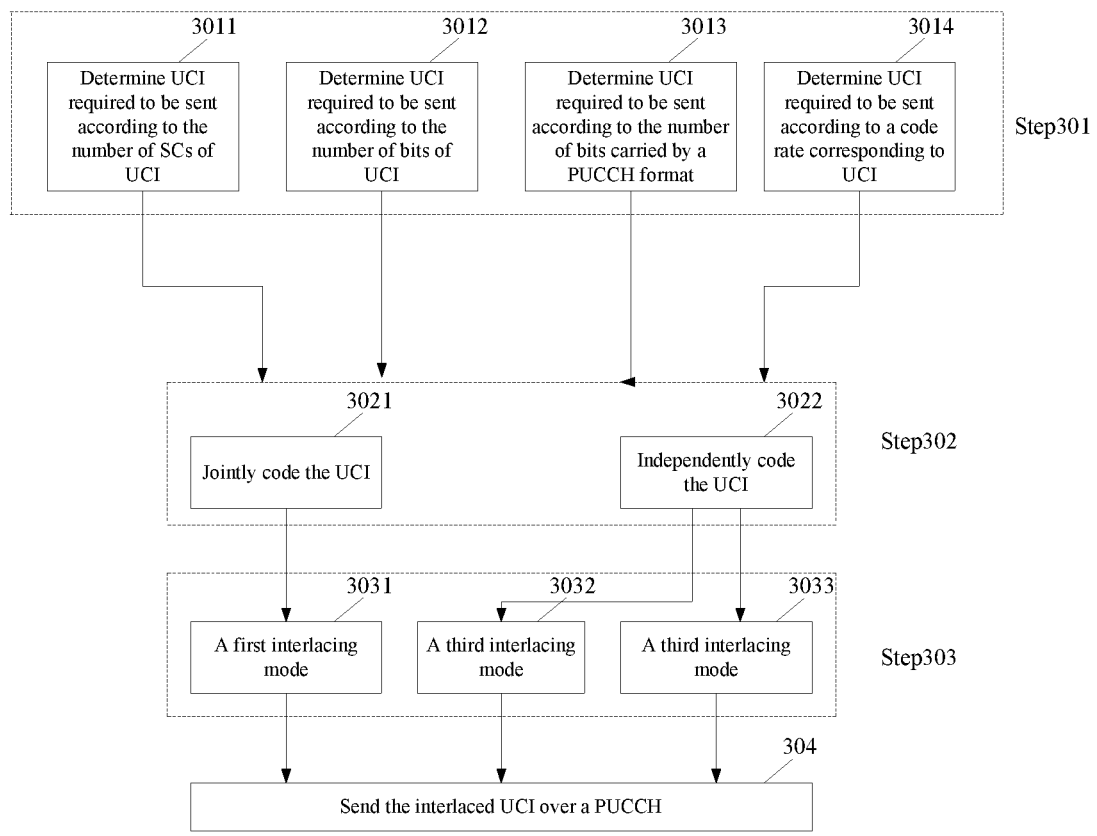
FIG. 5 is an overall flowchart of a method for sending UCI according to an alternative implementation of an embodiment of the disclosure.

FIG. 5 is an overall flowchart of a method for sending UCI according to an alternative implementation of an embodiment of the disclosure. As shown in FIG. 5, the step that UCI required to be sent is determined may include the sub-step as follows.

UCI required to be sent is determined according to at least one of the following rules.

In step 3011, UCI required to be sent is determined according to the number of SCs.

In step 3012, UCI required to be sent is determined according to the number of bits of UCI.

In step 3013, UCI required to be sent is determined according to a PUCCH format capacity (such as the number of bits carried by PUCCH format).

In step 3014, UCI required to be sent is determined according to a code rate corresponding to UCI.

Herein, step 3011 to step 3014 may be parallel technical solutions, which may be combined mutually in no particular order.

Alternatively, the rule that UCI required to be sent is determined according to the number of SCs includes the sub-rules as follows.

When the number N of SCs with UCI required to be sent is not greater than a preset number X of SCs with available for sending, UCI of N SCs is sent; and when the number N of SCs with UCI required to be sent is greater than a preset number X of SCs with UCI available for sending, UCI of X SCs is sent.

The rule that UCI required to be sent is determined according to the number of bits of UCI may include the sub-rules as follows. When the number of bits M1 of UCI required to be sent is not greater than a preset number of bits Y1 of UCI available for sending, M1-bit UCI is sent; and when the number of bits M1 of UCI required to be sent is greater than a preset number of bits Y1 of UCI available for sending, Y1-bit UCI is sent.

The rule that UCI required to be sent is determined according to a PUCCH format capacity may include the sub-rules as follows. When the number of bits M2 of UCI required to be sent is not greater than a maximum number of bits Y2 carried by a PUCCH format, M2-bit UCI is sent; and when the number of bits M2 of UCI required to be sent is greater than a maximum number of bits Y2 carried by a PUCCH format, Y2-bit UCI is sent.

The rule that UCI required to be sent is determined according to a code rate corresponding to UCI may include the sub-rules as follows. When a code rate P corresponding to UCI required to be sent is not greater than a preset code rate Z, the UCI is directly sent; and when a code rate P corresponding to UCI required to be sent is greater than a preset code rate Z, part of UCI is deleted until the code rate is smaller than the preset code rate Z.

The step that UCI required to be sent is determined may include or may further include the sub-step as follows.

When the UCI is HARQ-ACK information, the UCI is sorted according to a DAI field in DCI, the size of the DAI field being configured via high-layer signaling, or the size of the DAI field being a pre-appointed fixed value. Herein, the size of the DAI field configured via the high-layer signaling may be 2 bit or 4 bit, an enhanced Node B (eNB) and a terminal may pre-appoint that the size of the DAI field is 2 bit, or 3 bit or 4 bit; and values of the DAIs may be ascending sequentially according to an SC index, or ascending sequentially according to an SC attribute at first and then an SC index. Here, ascending sequentially according to an SC attribute at first and then an SC index refers to: sorting values of the DAIs according to an SC attribute sequentially in an ascending order, and ascending values of the DAIs corresponding to the same SC attribute sequentially according to an SC index. Alternatively, the SC attribute includes spectrum indication where SCs are located, i.e., an SC (licensed carrier) on a licensed spectrum or an SC (unlicensed carrier) on an unlicensed spectrum.

In step 302, the UCI is coded.

In the embodiment of the disclosure, the step that the UCI is coded may include the sub-step as follows.

In step 3021, the UCI is jointly coded.

In step 3022, the UCI is independently coded.

Herein, step 3021 and step 3022 may be parallel technical solutions, which may be combined mutually in no particular order.

In the embodiment of the disclosure, step 3021 of jointly coding the UCI may include the sub-step as follows.

The UCI required to be sent is cascaded and coded to obtain a UCI coding sequence.

The method may further include: acquiring priorities of the UCI.

In the method, the step that the UCI is cascaded may include the sub-step as follows.

The UCI is cascaded according to an SC index corresponding to the UCI, and/or the type of the UCI, and/or the priorities of the UCI. For example, the UCI may be cascaded according to the type of the UCI and then according to the SC index corresponding to the UCI; or, the UCI may be cascaded according to the priorities of the UCI and then according to the SC index corresponding to the UCI; or, the UCI may be cascaded according to the type of the UCI, then according to the priorities of the UCI, and according to the SC index corresponding to the UCI finally. For example, if UCI required to be sent by an SC1 is HARQ-ACK1, UCI required to be sent by an SC2 is high-priority CSI1, UCI required to be sent by an SC3 is high-priority CSI2, UCI required to be sent by an SC4 is low-priority CSI3, UCI required to be sent by an SC5 is high-priority HARQ-ACK2, and UCI required to be sent by an SC6 is high-priority CSI4, the UCI HARQ-ACK1 and the UCI HARQ-ACK2 of which the type is HARQ-ACK may be cascaded, and then the UCI CSI1, the UCI CSI2, the UCI CSI3 and the UCI CSI4 of which the type is CSI are cascaded, wherein HARQ-ACK1 and HARQ-ACK2 may be cascaded in an ascending order of SC indexes, CSI1, CSI2, CSI3 and CSI4 may be cascaded in a descending order of priorities, that is, high-priority CSIs (CSI1, CSI2, CSI4) are cascaded, and then a low-priority CSI (CSI3) is cascaded, where the high-priority CSIs may be cascaded in an ascending order of SC indexes.

After the UCI is cascaded, the method may further include the steps as follows.

CRC is added to the cascaded UCI; or,

CRC is added to the cascaded UCI corresponding to each priority.

In the embodiment of the disclosure, the method may further include the steps as follows.

Priorities of the UCI are acquired.

Step 3022 of independently coding the UCI may include the sub-step as follows.

The UCI corresponding to each priority is cascaded and independently coded to obtain a coding sequence corresponding to each priority. The length of the coding sequence is determined according to at least one of the following information: the number of bits of the UCI, time frequency resource size occupied by the PUCCH format, and a high-layer configuration offset.

In the embodiment of the disclosure, the method may further include the steps as follows.

CRC is added to the cascaded UCI corresponding to each priority.

In step 303, the coded UCI is interlaced.

The step that the coded UCI is interlaced may include the sub-steps as follows.

In step 3031, a first interlacing mode is adopted.

In step 3032, a second interlacing mode is adopted.

In step 3033, a third interlacing mode is adopted.

Herein, step 3031 corresponds to the joint coding process in step 3021, and step 3032 and step 3033 correspond to the independent coding process in step 3022.

In the embodiment of the disclosure, when the UCI is jointly coded by step 3021 in step 302, the step that the coded UCI is interlaced in the embodiment of the disclosure may include the sub-step as follows.

In step 3031, a UCI coding modulation sequence is determined according to a modulation mode corresponding to a PUCCH and the UCI coding sequence, the UCI coding modulation sequence is written into a matrix by row and then column, or, the UCI coding modulation sequence is written into a matrix by column and then row.

When the UCI is independently coded by step 3022 in step 302, the step that the coded UCI is interlaced in the embodiment of the disclosure may include the sub-steps as follows.

In step 3032, a UCI coding modulation sequence corresponding to each priority is determined according to a modulation mode corresponding to a PUCCH and a coding sequence corresponding to each priority.

The coding modulation sequences are cascaded in a descending order of priorities, and the cascaded coding modulation sequences are written into a matrix by row and then column.

Alternatively, the coding modulation sequences are cascaded according to the type of the UCI and then cascaded in a descending order of priorities, and the cascaded coding modulation sequences are written into a matrix by row and then column finally.

When the UCI is independently coded by step 3022 in step 302, the step that the coded UCI is interlaced in the embodiment of the disclosure may include the sub-steps as follows.

A UCI coding modulation sequence corresponding to each priority is determined according to a modulation mode corresponding to a PUCCH and a coding sequence corresponding to each priority.

The high-priority UCI coding modulation sequences are written into fixed columns of a matrix, and the low-priority UCI coding modulation sequences are written into the matrix by row and then column.

The size of the matrix in the embodiment of the disclosure may be associated with the time frequency resource size occupied by the PUCCH format.

In step 304, the interlaced UCI is sent over a PUCCH.

Alternatively, the step that the interlaced UCI is sent over a PUCCH includes the sub-step as follows.

The interlaced UCI is read out from the matrix by column and then row, and sent over the PUCCH.

The step that the interlaced UCI is sent over a PUCCH when the UCI includes HARQ-ACK information and Periodic CSI (P-CSI) information may include the sub-step as follows.

A PUCCH resource for sending the UCI is determined, and the UCI is sent by using the determined PUCCH resource.

Figure 6:
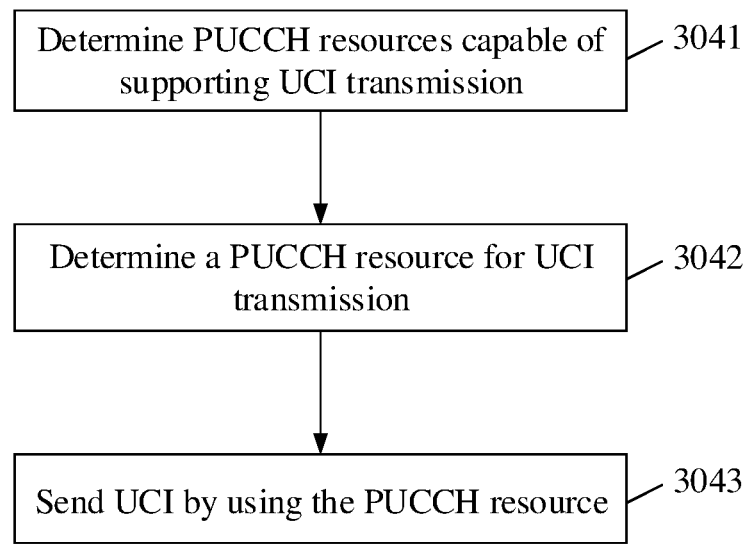
FIG. 6 is an overall flowchart of a method for determining a PUCCH resource for sending UCI according to an alternative implementation of an embodiment of the disclosure.

FIG. 6 is an overall flowchart of a method for determining a PUCCH resource for sending UCI according to an alternative implementation of an embodiment of the disclosure. As shown in FIG. 6, the method of determining a PUCCH resource for sending the UCI and sending the UCI by using the determined PUCCH resource in the embodiment of the disclosure may include the steps as follows.

In step 3041, PUCCH resources capable of supporting UCI transmission are determined.

Herein, the step that PUCCH resources capable of supporting UCI transmission are determined may include the sub-step as follows.

PUCCH resources capable of supporting UCI transmission are determined according to at least one of the following rules.

PUCCH resources capable of supporting UCI transmission are determined according to PUCCH resources for HARQ-ACK information transmission.

PUCCH resources capable of supporting UCI transmission are determined according to PUCCH resources for CSI transmission.

PUCCH resources capable of supporting UCI transmission are determined according to parameters configured by high-layer signaling for supporting simultaneous transmission of HARQ-ACK information and CSI information.

In step 3042, a PUCCH resource for UCI transmission is determined.

The step that a PUCCH resource for UCI transmission is determined may include the sub-step as follows.

A PUCCH resource for UCI transmission is determined according to at least one of the following manners.

A PUCCH resource for UCI transmission is determined at least according to loads of PUCCH resources capable of supporting UCI transmission, or a fixed resource is taken as a PUCCH resource for UCI transmission.

Alternatively, a PUCCH format for UCI transmission is determined, and a PUCCH resource corresponding to the PUCCH format for UCI transmission is determined.

Alternatively, the manner that a PUCCH resource for UCI transmission is determined according to loads of PUCCH resources capable of supporting UCI transmission includes the following sub-manners.

A PUCCH resource corresponding to a maximum supportable load in PUCCH resources capable of supporting UCI transmission is determined as a PUCCH resource for UCI transmission.

Or, a PUCCH resource corresponding to a minimum supportable load in PUCCH resources capable of supporting UCI transmission is determined as a PUCCH resource for UCI transmission.

Or, a minimum PUCCH resource corresponding to a minimum supportable load smaller than a maximum supportable load value in loads of UCI required to be sent in PUCCH resources capable of supporting UCI transmission is determined as a PUCCH resource for UCI transmission.

Herein, when it is determined that a PUCCH resource for UCI transmission corresponds to more than one PUCCH resource, a PUCCH resource corresponding to HARQ-ACK may be selected as a PUCCH resource for UCI transmission, or, a PUCCH resource corresponding to most PRBs may be selected as a PUCCH resource for UCI transmission, or, a PUCCH resource corresponding to CSI may be selected as a PUCCH resource for UCI transmission.

Alternatively, the fixed resource includes: a PUCCH resource corresponding to HARQ-ACK, or a PUCCH resource corresponding to CSI.

Herein, when it is determined that a PUCCH resource for UCI transmission corresponds to more than one PUCCH resource, a PUCCH resource corresponding to most PRBs may be selected, or, a PUCCH resource corresponding to a minimum supportable load in PUCCH resources corresponding to supportable loads greater than loads of UCI required to be sent may be selected; or, a PUCCH resource corresponding to a maximum supportable load may be selected, or, a PUCCH resource corresponding to a minimum supportable load may be selected; or, a PUCCH resource corresponding to most PRBs may be selected.

Or, a PUCCH format for UCI transmission may be determined, and a PUCCH resource corresponding to the PUCCH format for UCI transmission is determined.

The PUCCH format for UCI transmission may include:

a PUCCH format capable of carrying the UCI with most bits in PUCCH formats capable of supporting UCI transmission; or, a PUCCH format corresponding to HARQ-ACK; or, a PUCCH format corresponding to CSI.

When the determined PUCCH format for UCI transmission corresponds to a PUCCH resource, the PUCCH resource may be taken as a PUCCH resource for UCI transmission. When the PUCCH format corresponds to more than one PUCCH resource, a PUCCH resource corresponding to most PRBs may be selected as a PUCCH resource corresponding to the PUCCH format; or, a PUCCH resource corresponding to HARQ-ACK may be selected as a PUCCH resource corresponding to the PUCCH format; or, a maximum PUCCH resource corresponding to a maximum supportable load may be selected as a PUCCH resource corresponding to the PUCCH format; or, a minimum PUCCH resource corresponding to a maximum supportable load may be selected as a PUCCH resource corresponding to the PUCCH format.

In step 3043, the UCI is sent by using the PUCCH resource.

In the embodiment of the disclosure, the step that the interlaced UCI is sent over a PUCCH may include or may further include the sub-step as follows.

When resources corresponding to the PUCCH are indicated by ARI values, a resource corresponding to the PUCCH is determined according to the latest ARI value, and the UCI is sent by using the determined PUCCH resource.

In the embodiment of the disclosure, the method may further include the steps as follows.

For non-periodic CSI trigger, aggregated SCs are grouped, and a non-periodic CSI SC set is configured by high-layer signaling based on grouping.

In the embodiment of the disclosure, the method may further include the steps as follows.

In step 305, priorities of the UCI are determined.

In the embodiment of the disclosure, the step that priorities of the UCI are determined may include the sub-step as follows.

The CSI information contains two priorities, wherein the CSI information is divided into a first class of CSI information and a second class of CSI information, the first class of CSI information is determined as first-priority UCI, and the second class of CSI information is determined as second-priority UCI, wherein the priority of the first-priority UCI is higher than that of the second-priority UCI; or, the CSI information has the same priority.

Herein, the CSI information may be divided into a first class of CSI information and a second class of CSI information according to the type of CSI information, or may be divided in other division manners according to a practical requirement. For example, the first class of CSI information is CSI information of which the type is 3, 5, 6 and 2a, and the second class of CSI information is other types of CSI information; or, the first class of CSI information is a Rank Indicator (RI) and a Precoder Type Indicator (PTI), and the second class of CSI information is other CSI information. The above division method is only exemplary, and the embodiment of the disclosure does not limit a CSI information division manner.

When the UCI is CSI information and HARQ-ACK information, the step that priorities of the UCI are determined may further include the sub-steps as follows.

The priority of the HARQ-ACK information is higher than the priorities of all CSI information, or the priority of the HARQ-ACK information is the same as that of the first class of CSI information.

According to the methods as shown in FIG. 3 and FIG. 4, the method for sending UCI in the embodiment of the disclosure may combine various technical solutions. Part of the method for sending UCI in the embodiment of the disclosure will be introduced below in conjunction with alternative embodiments in detail.

In an alternative embodiment 1, 32 SCs are aggregated, and P-CSI information corresponding to N SCs is sent over a subframe n by using a PUCCH format 4, the size of the P-CSI information being M bits, wherein the alternative embodiment 1 includes alternative embodiments 1.1 to 1.2, the alternative embodiments 1.1 to 1.2 being in a precedence relationship.

Herein, the alternative embodiment 1.1 is a process of determining UCI required to be sent, and the alternative embodiment 1.2 is a process of coding, interlacing and sending the UCI.

In alternative embodiment 1.1, UCI required to be sent is determined, wherein the alternative embodiment 1.1 includes alternative embodiments 1.1.1 to 1.1.4, the alternative embodiments 1.1.1 to 1.1.4 being in a paralleling relationship.

In alternative embodiment 1.1.1, UCI required to be sent is determined according to the number of SCs. The operation may include: when the number N of SCs with UCI required to be sent is not greater than a preset number X of SCs with UCI available for sending, UCI of N SCs is sent; and when the number N of SCs with UCI required to be sent is greater than a preset number X of SCs with UCI available for sending, UCI of X SCs is sent.

Alternatively, the number of SCs with UCI available for sending may be preset as X, where X SCs are determined according to an SC index, or an SC index and the priority of P-CSI information (such as priority of P-CSI information stipulated in a current standard version).

When the number N of SCs with UCI required to be sent is greater than X, P-CSI information of N-X SCs is deleted, and P-CSI information of X SCs is only sent. The priority of CSI information may be, for example, as follows. Highest priority: information of which the P-CSI type is 3, 5, 6 and 2a; medium priority: information of which the P-CSI type is 2, 2b, 2c and 4; and lowest priority: information of which the P-CSI type is 1 and 1a, wherein CSI information corresponding to different types is as shown in Table 1.

TABLE 1

| Type | CSI information |
| --- | --- |
| Type 1 | Channel Quality Indicator (CQI) |
| Type 1a | Sub-band CQI and second Precoding Matrix Indicator (PMI) |
| Type 2 | Broadband CQI and PMI |
| Type 2a | Broadband PMI |
| Type 2b | Broadband CQI and PMI |
| Type 2c | Broadband CQI and PMI |
| Type 3 | RI |
| Type 4 | Broadband CQI |
| Type 5 | RI and broadband PMI |
| Type 6 | RI and PTI |

When the number N of SCs with UCI required to be sent is not greater than a preset number X of SCs with UCI available for sending, UCI of N SCs is sent.

In alternative embodiment 1.1.2, UCI required to be sent is determined according to the number of bits of UCI. The operation may include: when the number of bits M1 of UCI required to be sent is not greater than a preset number of bits Y1 of UCI available for sending, M1-bit UCI is sent; and when the number of bits M1 of UCI required to be sent is greater than a preset number of bits Y1 of UCI available for sending, only Y1-bit UCI is sent.

Alternatively, in order to ensure the reliability of information, it may be appointed that at most Y1-bit UCI is sent.

When M1 is greater than or equal to Y1, M1-Y1 bits of P-CSI information is deleted, and deletion may be determined according to an SC index or according to an SC index and the priority of P-CSI information, which may refer to the alternative embodiment 1, and will not be elaborated herein.

When M is smaller than Y1, Y1-bit P-CSI information is sent over the PUCCH format 4.

If the P-CSI information is divided into a first class of CSI information and a second class of CSI information, in the present alternative embodiment, CSI information required to be sent may be determined based on the pre-appointed number of first-priority UCI or the number of second-priority UCI. For example, when the number of first-priority UCI is greater than a preset threshold, the second-priority UCI may be deleted.

In alternative embodiment 1.1.3, UCI required to be sent is determined according to a PUCCH format capacity. The operation may include: when the number of bits M2 of UCI required to be sent is not greater than a maximum number of bits Y2 carried by a PUCCH format, M2-bit UCI is sent; and when the number of bits M2 of UCI required to be sent is greater than a maximum number of bits Y2 carried by a PUCCH format, only Y2-bit UCI is sent.

Alternatively, the maximum capacity value of the PUCCH format 4 may be 128, so Y2=128.

When M2 is greater than or equal to 128, M2-Y2 bits of the P-CSI information is deleted, and deletion may be determined according to an SC index or according to an SC index and the priority of P-CSI information, which may refer to the alternative embodiment 1, and will not be elaborated herein.

When M is smaller than 128, M2-bit P-CSI information is sent over the PUCCH format 4.

In alternative embodiment 1.1.4, UCI required to be sent is determined according to a code rate corresponding to UCI. The operation may include: when a code rate P corresponding to UCI required to be sent is not greater than a preset code rate Z, the UCI is directly sent; and when a code rate P corresponding to UCI required to be sent is greater than a preset code rate Z, part of UCI is deleted until the code rate is smaller than the preset code rate Z.

Alternatively, in order to ensure the reliability of information, a preset code rate of UCI is not higher than Z.

When a code rate of the P-CSI P is greater than Z, P-CSI is deleted until the code rate P is smaller than or equal to Z, and the deletion manner refers to the alternative embodiment 1, and will not be elaborated herein.

When a code rate of the P-CSI P is smaller than or equal to Z, the UCI is sent over the PUCCH format 4.

If the P-CSI information is divided into a first priority and a second priority, CSI information required to be sent may also be determined by appointing a first-priority CSI information code rate or a second-priority CSI information code rate.

Herein, the code rate may be determined according to a precoding number of bits, a modulation order corresponding to a PUCCH format and the number of resource blocks occupied by a PUCCH format.

In alternative embodiment 1.2, the UCI is coded, interlaced and sent, wherein the alternative embodiment 2 includes alternative embodiments 1.2.1 to 1.2.3, the alternative embodiments 1.2.1 to 1.2.3 being in a paralleling relationship. In the alternative embodiment 1.2, it is assumed that P-CSI information required to be sent is determined as M bits in the alternative embodiment 1.1.

In alternative embodiment 1.2.1, UCI is jointly coded, interlaced in a first interlacing mode and sent over a PUCCH.

Alternatively, the sent CSI information is cascaded and coded, wherein the CSI information may be cascaded according to a corresponding SC index, or may be cascaded according to the priority and an SC index.

Firstly, a coding judgment value Q may be determined, Q being a positive integer greater than or equal to 0. Alternatively, Q is 120.

When M is greater than or equal to Q, coding is performed by using a Turbo code.

When M is greater than or equal to 11 and smaller than or equal to Q, coding is performed by using a Tail Biting Convolution Code (TBCC).

When M is smaller than 11, coding is performed by using RM, wherein it is necessary to add CRC when coding is performed by using a TBCC and a Turbo code. Alternatively, CRC is 8 bit.

Alternatively, the CRC is added after the UCI is cascaded. Or, the CRC is added after the UCI corresponding to each priority is cascaded. Coded sequences form a coding modulation sequence by taking a modulation symbol as a unit, and the coding modulation sequence is written into a matrix by row and then column, the size of the matrix being, 12*12, associated with the time frequency size occupied by a data portion in a PUCCH format.

The interlaced UCI is read out from the matrix by column and then row, and sent over the PUCCH.

Or, the coded sequence is directly sent over the PUCCH.

In alternative embodiment 1.2.2, UCI is independently coded, interlaced in a second interlacing mode and sent over a PUCCH.

CSIs required to be sent are divided into a first class of CSI information and a second class of CSI information, wherein the first class of CSI information is P-CSI information of which the type is 3, 5, 6 and 2a, and the second class of CSI information is other types of P-CSI information; or, the first class of CSI information is RI and PTI, and the second class of CSI information is other CSI information, wherein the first class of CSI information is first-priority UCI, and the second class of CSI information is second-priority UCI; and a coding sequence corresponding to the first-priority UCI is obtained by coding the first-priority UCI, and a coding sequence corresponding to the second-priority UCI is obtained by coding the second-priority UCI.

Herein, the length $Q_1$ of the sequence obtained by coding the first-priority UCI may be: $Q_1=Q'^*Q_m$;

the length $Q_2$ of the sequence obtained by coding the second-priority UCI may be: $Q_2=M^*N^*Q_m-Q_1$, where $Q_m$ is an adjustment order corresponding to a PUCCH format 4; because a modulation mode of the PUCCH format 4 is QPSK, $Q_m=2$; M is the number of subcarriers occupied by the PUCCH format 4, M=12, N is the number of time domain symbols occupied by the PUCCH format 4, and N=12;

$$Q' = \min\left(\left\lceil \frac{\beta * O_1 * M * N}{\beta * O_1 + O_2} \right\rceil, Q_{1max}\right),$$

where $Q_1$ is the number of bits of first-priority UCI, $O_2$ is the number of bits of second-priority UCI, $\beta$ is a high-layer configuration offset, $Q_{1max}$ is a fixed value, and alternatively, $Q_{1max}$ is $(M^*N/2)^*Q_m$, or a value configured by high-layer signaling;

or, the lengths of both the sequences obtained by coding the first-priority UCI and the second-priority UCI are fixed values, and alternatively, the lengths of both the sequences obtained by coding the first-priority UCI and the second-priority UCI are $(M^*N/2)^*Q_m$;

or, the length of the sequence obtained by coding the first-priority UCI is configured by high-layer signaling.

A UCI coding modulation sequence corresponding to each priority may be obtained according to a modulation mode corresponding to a PUCCH format and a coding sequence corresponding to each priority, a coding modulation sequence corresponding to first-priority UCI is written into a matrix by row and then column, and a coding modulation sequence corresponding to second-priority UCI is written into the matrix, the size of the matrix being, 12*12, associated with the time frequency size occupied by a data portion in a PUCCH format.

The interlaced UCI is read out from the matrix by column and then row, and sent over the PUCCH.

In alternative embodiment 1.2.3, UCI is independently coded, interlaced in a third interlacing mode and sent over a PUCCH.

CSIs required to be sent are divided into a first class of CSI information and a second class of CSI information, wherein the first class of CSI information is first-priority UCI, and the second class of CSI information is second-priority UCI; and a coding sequence corresponding to the first-priority UCI is obtained by coding the first-priority UCI, and a coding sequence corresponding to the second-priority UCI is obtained by coding the second-priority UCI.

Herein, the length $Q_1$ of the sequence obtained by coding the first-priority UCI may be: $Q_1=Q'^*Q_m$;

the length $Q_2$ of the sequence obtained by coding the second-priority UCI may be: $Q_2=M^*N^*Q_m-Q_1$, where $Q_m$ is an adjustment order corresponding to a PUCCH format 4; because a modulation mode of the PUCCH format 4 is QPSK, $Q_m=2$; M is the number of subcarriers occupied by the PUCCH format 4, M=12, N is the number of time domain symbols occupied by the PUCCH format 4, and N=12;

$$Q' = \min\left(\left\lceil \frac{\beta * O_1 * M * N}{\beta * O_1 + O_2} \right\rceil, Q_{1max}\right),$$

where $O_1$ is the number of bits of first-priority UCI, $\beta$ is a high-layer configuration offset, and the value of $Q_{1max}$ is associated with the number of symbols occupied by the first-priority UCI.

A UCI coding modulation sequence corresponding to each priority may be obtained according to a modulation mode corresponding to a PUCCH format and a coding sequence corresponding to each priority, a coding modulation sequence corresponding to first-priority UCI is written into a fixed position of a matrix, and then a coding modulation sequence corresponding to second-priority UCI is written into the matrix by row and then column, wherein the written matrix unit is skipped during writing. The fixed position includes second, third, eighth and ninth columns of the matrix, or first, second, third, fourth, seventh, eighth, ninth and tenth columns of the matrix, the size of the matrix being, 12*12, associated with the time frequency size occupied by a data portion in a PUCCH format.

The interlaced UCI is read out from the matrix by column and then row, and sent over the PUCCH.

In the alternative embodiment 2, 32 SCs are aggregated and HARQ-ACK information (K bits) and P-CSI information (M bits) corresponding to D SCs are sent over a subframe n, wherein the alternative embodiment 1 includes alternative embodiments 2.1 to 2.3, the alternative embodiments 2.1 to 2.3 being in a precedence relationship.

Herein, the alternative embodiment 2.1 is a process of determining UCI required to be sent, the alternative embodiment 2.2 is a process of coding, interlacing and sending the UCI, and the alternative embodiment 2.3 is a process of sending the interlaced UCI over a PUCCH.

In alternative embodiment 2.1, UCI required to be sent is determined, wherein the alternative embodiment 2.1 includes alternative embodiments 2.1.1 to 2.1.2, the alternative embodiments 2.1.1 to 2.1.2 being in a paralleling relationship.

In alternative embodiment 2.1.1, UCI required to be sent is determined according to a PUCCH format capacity. Alternatively, HARQ-ACK and P-CSI required to be sent are determined according to a PUCCH format capacity, and a maximum capacity value of a PUCCH format 4 is 128.

When K+M is greater than 128, HARQ-ACK information is sent.

When K+M is smaller than or equal to 128, HARQ-ACK information and P-CSI information are sent.

In alternative embodiment 2.1.2, UCI required to be sent is determined according to a PUCCH format capacity and the number of bits of UCI. Alternatively, HARQ-ACK and P-CSI required to be sent are determined according to a PUCCH format capacity and the number of bits of UCI, and a maximum capacity value of a PUCCH format 4 is 128.

When K+M is greater than 128, HARQ-ACK information may be sent.

When K+M is smaller than or equal to 128 and K is greater than or equal to a threshold G, HARQ-ACK information may be sent.

When K+M is smaller than or equal to 128 and K is smaller than a threshold G, HARQ-ACK information and CSI information may be sent.

When K+M is greater than 128, HARQ-ACK information and CSI information may be sent, wherein part of CSI information is deleted until K+M<=128, where the number of bits of the sent CSI information is 128-K.

In alternative embodiment 2.2, the UCI is coded, interlaced and sent, wherein the alternative embodiment 2 includes alternative embodiments 2.2.1 to 2.2.6, the alternative embodiments 2.2.1 to 2.2.3 being in a paralleling relationship.

In alternative embodiment 2.2.1, UCI is jointly coded, interlaced in a first interlacing mode and sent over a PUCCH.

UCI required to be sent is cascaded and coded, HARQ-ACK information and CSI information are cascaded in sequence, CRC is added ahead of cascading, and alternatively, CRC is 8 bit. HARQ-ACK information, a first class of CSI corresponding to first-priority UCI and a second class of CSI corresponding to second-priority UCI are cascaded in sequence, CRC is added to the HARQ-ACK information, the first-priority UCI and the second-priority UCI respectively, and alternatively, CRC is 8 bit.

Coded sequences form a coding modulation sequence by taking a modulation symbol as a unit, and the coding modulation sequence may be written into a matrix by row and then column, the size of the matrix being, 12*12, associated with the time frequency size occupied by a data portion in a PUCCH format.

The interlaced UCI is read out from the matrix by column and then row, and sent over the PUCCH.

Or, the coded sequences may be directly sent over the PUCCH.

In alternative embodiment 2.2.2, UCI is independently coded, interlaced in a second interlacing mode and sent over a PUCCH.

Because the priority of HARQ-ACK information is higher than that of CSI information, the HARQ-ACK information is first-priority UCI, and the CSI information is second-priority UCI. The first-priority UCI may be coded to obtain a coding sequence corresponding to the first-priority UCI, and the second-priority UCI is coded to obtain a coding sequence corresponding to the second-priority UCI, wherein CRC is added to the first-priority UCI and the second-priority UCI respectively before coding, and alternatively, the length of CRC is 8.

Herein, the length of the sequence obtained by coding the first-priority UCI may be: $Q_1=Q'*Q_m$;

the length of the sequence obtained by coding the second-priority UCI may be: $Q_2=M*N*Q_m-Q_1$, where $Q_m$ is an adjustment order corresponding to a PUCCH format 4; because a modulation mode of the PUCCH format 4 is QPSK, $Q_m=2$; M is the number of subcarriers occupied by the PUCCH format 4, M=12, N is the number of time domain symbols occupied by the PUCCH format 4, and N=12;

$$Q' = \min\left(\left\lceil \frac{\beta*O_1*M*N}{\beta*O_1+O_2} \right\rceil, Q_{1max}\right),$$

where $O_1$ is the number of bits of first-priority UCI, $O_2$ is the number of bits of second-priority UCI, $\beta$ is a high-layer configuration offset, $Q_{1max}$ is a fixed value, and alternatively, $Q_{1max}$ is $(M*N/2)*Q_m$, or a high-layer configuration value;

or, the lengths of both the sequences obtained by coding the first-priority UCI and the second-priority UCI may be $(M*N/2)*Q_m$;

A UCI coding modulation sequence corresponding to each priority may be obtained according to a modulation mode corresponding to a PUCCH format and a coding sequence corresponding to each priority, a coding modulation sequence corresponding to first-priority UCI is written into a matrix by row and then column, and then a coding modulation sequence corresponding to second-priority UCI is written into the matrix, the size of the matrix being, 12*12, associated with the time frequency size occupied by a data portion in a PUCCH format.

The interlaced UCI is read out from the matrix by column and then row, and sent over the PUCCH.

In alternative embodiment 2.2.3, UCI is independently coded, interlaced in a third interlacing mode and sent over a PUCCH.

Because the priority of HARQ-ACK information is higher than that of CSI information, the HARQ-ACK information is first-priority UCI, and the CSI information is second-priority UCI.

The first-priority UCI may be coded to obtain a coding sequence corresponding to the first-priority UCI, and the second-priority UCI is coded to obtain a coding sequence corresponding to the second-priority UCI, wherein CRC is added to the first-priority UCI and the second-priority UCI respectively before coding, and alternatively, the length of CRC is 8.

Herein, the length of the sequence obtained by coding the first-priority UCI may be: $Q_1=Q'*Q_m$;

the length of the sequence obtained by coding the second-priority UCI may be: $Q_2=M*N*Q_m-Q_1$, where $Q_m$ is an adjustment order corresponding to a PUCCH format 4; because a modulation mode of the PUCCH format 4 is QPSK, $Q_m=2$; M is the number of subcarriers occupied by the PUCCH format 4, M=12, N is the number of time domain symbols occupied by the PUCCH format 4, and N=12;

$$Q' = \min\left(\left[\frac{\beta*O_1*M*N}{\beta*O_1+O_2}\right], Q_{1max}\right),$$

where $O_1$ is the number of bits of first-priority UCI, β is a high-layer configuration offset, and the value of $Q_{1max}$ is associated with the number of symbols occupied by the first-priority UCI.

A UCI coding modulation sequence corresponding to each priority may be obtained according to a modulation mode corresponding to a PUCCH format and a coding sequence corresponding to each priority, a coding modulation sequence corresponding to first-priority UCI is written into a fixed position of a matrix, and then a coding modulation sequence corresponding to second-priority UCI is written into the matrix by row and then column, wherein the written matrix unit is skipped during writing. The fixed position includes second, third, eighth and ninth columns of the matrix, or first, second, third, fourth, seventh, eighth, ninth and tenth columns of the matrix, the size of the matrix being, 12*12, associated with the time frequency size occupied by a data portion in a PUCCH format.

The interlaced UCI is read out from the matrix by column and then row, and sent over the PUCCH.

In alternative embodiment 2.2.4, UCI is independently coded, interlaced in a second interlacing mode and sent over a PUCCH.

Because the priority of HARQ-ACK information is the same as that of a first class of CSI information, the HARQ-ACK information and the first class of CSI information are first-priority UCI, and a second class of CSI information is second-priority UCI. The HARQ-ACK information and the first class of CSI information may be cascaded and coded to obtain a coding sequence corresponding to the first-priority UCI, the second-priority UCI is coded to obtain a coding sequence corresponding to the second-priority UCI, and the information is sent over a PUCCH in manners as shown in the alternative embodiment 2.2.1 and the alternative embodiment 2.2.2, which will not be elaborated herein.

In alternative embodiment 2.2.5, UCI is independently coded, interlaced in a third interlacing mode and sent over a PUCCH.

Because the priority of HARQ-ACK information is higher than that of a first class of CSI information, the HARQ-ACK information is first-priority UCI, the first class of CSI information is second-priority UCI, and a second class of CSI information is third-priority UCI. The first-priority UCI may be coded to obtain a coding sequence corresponding to the first-priority UCI, the second-priority UCI is coded to obtain a coding sequence corresponding to the second-priority UCI, and the third-priority UCI is coded to obtain a coding sequence corresponding to the third-priority UCI.

Herein, the length of the sequence obtained by coding the first-priority UCI may be: $Q_1=Q'*Q_m$;

the length of the sequence obtained by coding the second-priority UCI may be: $Q_2=Q_2'*Q_m$;

the length of the sequence obtained by coding the third-priority UCI may be: $Q_3=M*N*Q_m-Q_1-Q_2$, where $Q_m$ is an adjustment order corresponding to a PUCCH format 4; because a modulation mode of the PUCCH format 4 is QPSK, $Q_m=2$; M is the number of subcarriers occupied by the PUCCH format 4, M=12, N is the number of time domain symbols occupied by the PUCCH format 4, and N=12;

$$Q' = \min\left(\left[\frac{\beta*O_1*M*N}{\beta*O_1+O_2}\right], Q_{1max}\right),$$

where $O_1$ is the number of bits of first-priority UCI, $\beta_1$ is a high-layer configuration offset, and the value of $Q_{1max}$ is associated with the number of symbols occupied by the first-priority UCI;

$$Q_2' = \min\left(\left[\frac{\beta*O_1*M*N}{\beta*O_1+O_2}\right], Q_{2max}\right),$$

where $O_2$ is the number of bits of first-priority UCI, $\beta_2$ is a high-layer configuration offset, and the value of $Q_{2max}$ is associated with the number of symbols occupied by the first-priority UCI.

A UCI coding modulation sequence corresponding to each priority may be obtained according to a modulation mode corresponding to a PUCCH format and a coding sequence corresponding to each priority, coding modulation sequences corresponding to first-priority UCI with a higher priority and second-priority UCI are written into fixed columns of a matrix respectively, and then a coding modulation sequence corresponding to third-priority UCI is written into the matrix by row and then column, wherein the written matrix unit is skipped during writing. For example, the fixed columns corresponding to the first-priority UCI are second, third, eighth and ninth columns of the matrix, and the fixed columns corresponding to the second-priority UCI are first, fourth, seventh and tenth columns of the matrix, the size of the matrix being, 12*12, associated with the time frequency size occupied by a data portion in a PUCCH format.

The interlaced UCI is read out from the matrix by column and then row, and sent over the PUCCH.

In alternative embodiment 2.2.6, UCI is independently coded, interlaced in a third interlacing mode and sent over a PUCCH.

Because the priority of HARQ-ACK information is higher than that of a first class of CSI information, the HARQ-ACK information is first-priority UCI, the first class of CSI information is second-priority UCI, and a second class of CSI information is third-priority UCI. The first-priority UCI may be coded to obtain a coding sequence corresponding to the first-priority UCI, the second-priority UCI is coded to obtain a coding sequence corresponding to the second-priority UCI, and the third-priority UCI is coded to obtain a coding sequence corresponding to the third-priority UCI.

Herein, the length of the sequence obtained by coding the first-priority UCI may be: $Q_1=Q_1'*Q_m$;

the length of the sequence obtained by coding the second-priority UCI may be: $Q_2=Q_2'*Q_m$;

the length of the sequence obtained by coding the third-priority UCI may be: $Q_3=M*N*Q_m-Q_1-Q_2$, where $Q_m$ is an adjustment order corresponding to a PUCCH format 4; because a modulation mode of the PUCCH format 4 is QPSK, $Q_m=2$; M is the number of subcarriers occupied by the PUCCH format 4, M=12, N is the number of time domain symbols occupied by the PUCCH format 4, and N=12;

$$Q' = \min\left(\left[\frac{\beta*O_1*M*N}{\beta*O_1+O_2}\right], Q_{1max}\right),$$

where $O_1$ is the number of bits of first-priority UCI, $\beta_1$ is a high-layer configuration offset, and the value of $Q_{1max}$ is associated with the number of symbols occupied by the first-priority UCI;

$$Q_2' = \min\left(\left[\frac{\beta*O_1*M*N}{\beta*O_1+O_2}\right], Q_{2max}\right),$$

where $O_2$ is the number of bits of first-priority UCI, $\beta_2$ is a high-layer configuration offset, and the value of $Q_{2max}$ is associated with the number of symbols occupied by the first-priority UCI.

Coding modulation sequences corresponding to first-priority UCI with a higher priority and second-priority UCI are cascaded and then written into fixed columns of a matrix, and then a coding modulation sequence corresponding to third-priority UCI is written into the matrix by row and then column, wherein the written matrix unit is skipped during writing. Herein, the fixed columns are first, second, third, fourth, seventh, eighth, ninth and tenth columns of the matrix, the size of the matrix being, 12*12, associated with the time frequency size occupied by a data portion in a PUCCH format.

In alternative embodiment 2.3, the interlaced UCI is read out from the matrix by column and then row, and sent over the PUCCH, wherein the alternative embodiment 2 includes alternative embodiments 2.3.1 to 2.3.8.

Alternative Embodiment 2.3.1

It is assumed that a PUCCH format 4 resource is used for HARQ-ACK transmission, wherein a maximum supportable load is 40, obtained by means of the number of aggregated carriers and a transmission mode corresponding to an SC (implicit mode). It is assumed that a PUCCH format 5 resource (maximum supportable load is 40) and a PUCCH format 4 resource (maximum supportable load is 100) are used for CSI transmission, parameters for simultaneously transmitting HARQ-ACK information and CSI configured by a high layer in a PUCCH format 4 are true, parameters for simultaneously transmitting HARQ-ACK information and CSI configured by a high layer in a PUCCH format 5 are true, and the sum of HARQ-ACK information and CSI information required to be sent is 150. As such, PUCCH resources capable of supporting UCI during simultaneous transmission of HARQ-ACK information and CSI may include {PUCCH format 4 resource corresponding to HARQ-ACK, PUCCH format 4 resource corresponding to CSI, PUCCH format 5 resource corresponding to CSI}.

PUCCH resources for simultaneously transmitting HARQ-ACK information and CSI information may be determined in any one of the following manners.

A PUCCH resource for UCI transmission may be determined according to loads of PUCCH resources capable of supporting UCI transmission. Alternatively, a maximum PUCCH resource corresponding to a maximum supportable load, namely a PUCCH format 4 resource corresponding to CSI, is selected; or, a minimum PUCCH resource corresponding to a maximum supportable load, namely one of a PUCCH format 4 resource corresponding to HARQ-ACK or a PUCCH format 5 resource corresponding to CSI, is selected, and in this case, the PUCCH format 4 resource corresponding to HARQ-ACK is selected.

A fixed resource may be taken as a PUCCH resource for UCI transmission. Alternatively, a PUCCH format 4 resource corresponding to HARQ-ACK is selected; or, a PUCCH format 4 resource corresponding to CSI or PUCCH format 5 resource corresponding to CSI is selected, and a PUCCH resource corresponding to a minimum supportable load in PUCCH resources corresponding to supportable loads greater than loads of UCI required to be transmitted is selected, namely a PUCCH format 5 resource; or, a maximum PUCCH resource corresponding to a maximum supportable load is selected, namely a PUCCH format 4 resource corresponding to CSI.

A PUCCH format for UCI transmission is determined, and then a PUCCH resource corresponding to the PUCCH format for UCI transmission is determined. Alternatively, a maximum supportable load corresponding to a PUCCH format 4 resource corresponding to CSI is maximum, so that the PUCCH format 4 is selected as a PUCCH format for simultaneously transmitting HARQ-ACK and CSI. The format corresponds to two PUCCH resources. Because the supportable load of the PUCCH format 4 resource corresponding to CSI is maximum, the PUCCH format4 resource corresponding to CSI is selected to send HARQ-ACK and CSI.

Alternative Embodiment 2.3.2

It is assumed that a PUCCH format 4 resource is used for HARQ-ACK transmission, wherein a maximum supportable load is 40, obtained by means of the number of aggregated carriers and a transmission mode corresponding to an SC (implicit mode). It is assumed that a PUCCH format 5 resource (maximum supportable load is 40) and a PUCCH format4 resource (maximum supportable load is 100) are used for CSI transmission, parameters for simultaneously transmitting HARQ-ACK information and CSI configured by a high layer in a PUCCH format 4 are true, parameters for simultaneously transmitting HARQ-ACK information and CSI configured by a high layer in a PUCCH format 5 are false, and the sum of HARQ-ACK information and CSI information required to be sent is 150. As such, PUCCH resources capable of supporting UCI during simultaneous transmission of HARQ-ACK information and CSI may include {PUCCH format 4 resource corresponding to HARQ-ACK, PUCCH format 4 resource corresponding to CSI}.

PUCCH resources for simultaneously transmitting HARQ-ACK information and CSI information may be determined in any one of the following manners.

A PUCCH resource for UCI transmission may be determined according to loads of PUCCH resources capable of supporting UCI transmission. Alternatively, a maximum PUCCH resource corresponding to a maximum supportable load, namely a PUCCH format 4 resource corresponding to CSI, is selected; or, a minimum PUCCH resource corresponding to a maximum supportable load, namely a PUCCH format 4 resource corresponding to HARQ-ACK, is selected.

A fixed resource may be taken as a PUCCH resource for UCI transmission. Alternatively, a PUCCH format 4 resource corresponding to HARQ-ACK is selected; or, a PUCCH format 4 resource corresponding to CSI is selected.

A PUCCH format for UCI transmission is determined at first, and then a PUCCH resource corresponding to the PUCCH format for UCI transmission is determined. Alternatively, only a PUCCH format 4 can support simultaneous transmission, so that the PUCCH format 4 is selected as a PUCCH format for simultaneously transmitting HARQ-ACK and CSI. The format corresponds to two PUCCH resources. Because the supportable load of the PUCCH format 4 resource corresponding to CSI is maximum, the PUCCH format 4 resource corresponding to CSI is selected to send HARQ-ACK and CSI.

Alternative Embodiment 2.3.3

It is assumed that a PUCCH format 5 resource is used for HARQ-ACK transmission, wherein a maximum supportable load is 128, obtained by means of the number of aggregated carriers and a transmission mode corresponding to an SC (implicit mode). It is assumed that a PUCCH format 5 resource (maximum supportable load is 40) and a PUCCH format 4 resource (maximum supportable load is 200) are used for CSI transmission, parameters for simultaneously transmitting HARQ-ACK information and CSI configured by a high layer in a PUCCH format 4 are true, parameters for simultaneously transmitting HARQ-ACK information and CSI configured by a high layer in a PUCCH format 5 are true, and the sum of HARQ-ACK information and CSI information required to be sent is 150. As such, PUCCH resources capable of supporting UCI during simultaneous transmission of HARQ-ACK information and CSI may include {PUCCH format 5 resource corresponding to HARQ-ACK, PUCCH format 4 resource corresponding to CSI, and PUCCH format 5 resource corresponding to CSI}.

PUCCH resources for simultaneously transmitting HARQ-ACK information and CSI information may be determined in any one of the following manners.

A PUCCH resource for UCI transmission may be determined according to loads of PUCCH resources capable of supporting UCI transmission. Alternatively, a maximum PUCCH resource corresponding to a maximum supportable load, namely a PUCCH format 4 resource corresponding to CSI, is selected; or, a minimum PUCCH resource corresponding to a maximum supportable load, namely a PUCCH format 5 resource corresponding to HARQ-ACK, is selected; or, only when a maximum supportable load corresponding to a PUCCH format 5 resource corresponding to CSI is greater than 150, a PUCCH format 4 resource corresponding to CSI is selected.

A fixed resource may be taken as a PUCCH resource for UCI transmission. Alternatively, a PUCCH format 5 resource corresponding to HARQ-ACK is selected; or, a PUCCH format 4 resource corresponding to CSI or PUCCH format 5 resource corresponding to CSI is selected, and a PUCCH resource corresponding to a minimum supportable load in PUCCH resources corresponding to supportable loads greater than loads of UCI required to be transmitted is selected, namely a PUCCH format 4 resource; or, a maximum PUCCH resource corresponding to a maximum supportable load is selected, namely a PUCCH format 4 resource corresponding to CSI.

A PUCCH format for UCI transmission is determined at first, and then a PUCCH resource corresponding to the PUCCH format for UCI transmission is determined. Alternatively, a maximum supportable load corresponding to a PUCCH format 4 is maximum, so that the PUCCH format 4 is selected as a PUCCH format for simultaneously transmitting HARQ-ACK and CSI. The format corresponds to one PUCCH resource, so that the PUCCH format 4 resource corresponding to CSI is selected to send HARQ-ACK and CSI.

Alternative Embodiment 2.3.4

It is assumed that a PUCCH format 5 resource is used for HARQ-ACK transmission, wherein a maximum supportable load is 128, obtained by means of the number of aggregated carriers and a transmission mode corresponding to an SC (implicit mode). It is assumed that a PUCCH format 4 resource (maximum supportable load is 150) and a PUCCH format 3 resource (maximum supportable load is 22) are used for CSI transmission, parameters for simultaneously transmitting HARQ-ACK information and CSI configured by a high layer in a PUCCH format 4 are true, parameters for simultaneously transmitting HARQ-ACK information and CSI configured by a high layer in a PUCCH format 5 are true, and the sum of HARQ-ACK information and CSI information required to be sent is 100. As such, PUCCH resources capable of supporting UCI during simultaneous transmission of HARQ-ACK information and CSI may include {PUCCH format 5 resource corresponding to HARQ-ACK, PUCCH format 4 resource corresponding to CSI, and PUCCH format 3 resource corresponding to CSI}.

PUCCH resources for simultaneously transmitting HARQ-ACK information and CSI information may be determined in any one of the following manners.

A PUCCH resource for UCI transmission may be determined according to loads of PUCCH resources capable of supporting UCI transmission. Alternatively, a maximum PUCCH resource corresponding to a maximum supportable load, namely a PUCCH format 4 resource corresponding to CSI, is selected; or, a minimum PUCCH resource corresponding to a maximum supportable load, namely a PUCCH format 3 resource corresponding to CSI, is selected; or, when maximum supportable loads corresponding to a PUCCH format 4 resource corresponding to CSI and a PUCCH format 5 resource corresponding to HARQ-ACK are greater than 100 and the maximum supportable load corresponding to the PUCCH format 5 resource corresponding to HARQ-ACK is smaller than the maximum supportable load corresponding to the PUCCH format 4 resource corresponding to CSI, the PUCCH format 5 resource corresponding to HARQ-ACK is selected.

A fixed resource may be taken as a PUCCH resource for UCI transmission. Alternatively, a PUCCH format 5 resource corresponding to HARQ-ACK is selected; or, a PUCCH format 4 resource corresponding to CSI or PUCCH format 3 resource corresponding to CSI is selected, and a PUCCH resource corresponding to a minimum supportable load in PUCCH resources corresponding to supportable loads greater than loads of UCI required to be transmitted is selected, namely a PUCCH format 5 resource corresponding to HARQ-ACK; or, a maximum PUCCH resource corresponding to a maximum supportable load is selected, namely a PUCCH format 4 resource corresponding to CSI.

A PUCCH format for UCI transmission is determined at first, and then a PUCCH resource corresponding to the PUCCH format for UCI transmission is determined. Alternatively, a maximum supportable load corresponding to a PUCCH format 4 is maximum, so that the PUCCH format 4 is selected as a PUCCH format for simultaneously transmitting HARQ-ACK and CSI. The format corresponds to one PUCCH resource, so that the PUCCH format4 resource corresponding to CSI is selected to send HARQ-ACK and CSI.

Alternative Embodiment 2.3.5

It is assumed that a PUCCH format 5 resource is used for HARQ-ACK transmission, wherein a maximum supportable load is 128, obtained by means of the number of aggregated carriers and a transmission mode corresponding to an SC (implicit mode). It is assumed that a PUCCH format 5 resource (maximum supportable load is 150) is used for CSI transmission, parameters for simultaneously transmitting HARQ-ACK information and CSI configured by a high layer in a PUCCH format 5 are false, and the sum of HARQ-ACK information and CSI information required to be sent is 100. CSI is deleted, and HARQ-ACK is transmitted over the PUCCH format 5 resource.

Alternative Embodiment 2.3.6

It is assumed that a PUCCH format 5 resource is used for HARQ-ACK transmission, wherein a maximum supportable load is 128, obtained by means of the number of aggregated carriers and a transmission mode corresponding to an SC (implicit mode). It is assumed that a PUCCH format 4 resource (maximum supportable load is 150) is used for CSI transmission, parameters for simultaneously transmitting HARQ-ACK information and CSI configured by a high layer in a PUCCH format 4 are true, parameters for simultaneously transmitting HARQ-ACK information and CSI configured by a high layer in a PUCCH format 5 are true, and the sum of HARQ-ACK information and CSI information required to be sent is 100. As such, PUCCH resources capable of supporting UCI during simultaneous transmission of HARQ-ACK information and CSI may include {PUCCH format 5 resource corresponding to HARQ-ACK, PUCCH format 4 resource corresponding to CSI}.

PUCCH resources for simultaneously transmitting HARQ-ACK information and CSI information may be determined in any one of the following manners.

A PUCCH resource for UCI transmission may be determined according to loads of PUCCH resources capable of supporting UCI transmission. Alternatively, a maximum PUCCH resource corresponding to a maximum supportable load, namely a PUCCH format 4 resource corresponding to CSI, is selected; or, a minimum PUCCH resource corresponding to a maximum supportable load, namely a PUCCH format 5 resource corresponding to HARQ-ACK, is selected; or, when maximum supportable loads corresponding to a PUCCH format 4 resource corresponding to CSI and a PUCCH format5 resource corresponding to HARQ-ACK are greater than 100 and the maximum supportable load corresponding to the PUCCH format 5 resource corresponding to HARQ-ACK is smaller than the maximum supportable load corresponding to the PUCCH format 4 resource corresponding to CSI, the PUCCH format 5 resource corresponding to HARQ-ACK is selected.

A fixed resource may be taken as a PUCCH resource for UCI transmission. Alternatively, a PUCCH format 5 resource corresponding to HARQ-ACK is selected; or, a PUCCH format 4 resource corresponding to CSI is selected.

A PUCCH format for UCI transmission is determined at first, and then a PUCCH resource corresponding to the PUCCH format for UCI transmission is determined. Alternatively, a maximum supportable load corresponding to a PUCCH format 4 is maximum, so that the PUCCH format 4 is selected as a PUCCH format for simultaneously transmitting HARQ-ACK and CSI. The format corresponds to one PUCCH resource, so that the PUCCH format4 resource corresponding to CSI is selected to send HARQ-ACK and CSI.

Alternative Embodiment 2.3.7

It is assumed that a PUCCH format 1a/1b resource is used for HARQ-ACK transmission. It is assumed that a PUCCH format 5 resource (maximum supportable load is 100) and a PUCCH format 4 resource (maximum supportable load is 200) are used for CSI transmission, parameters for simultaneously transmitting HARQ-ACK information and CSI configured by a high layer in a PUCCH format 4 are true, and parameters for simultaneously transmitting HARQ-ACK information and CSI configured by a high layer in a PUCCH format 5 are true, so that a PUCCH format for UCI transmission during simultaneous transmission of HARQ-ACK information and CSI is {PUCCH format 1a/1b resource corresponding to HARQ-ACK, PUCCH format 4 resource corresponding to CSI, PUCCH format 5 resource corresponding to CSI}.

A PUCCH resource for UCI transmission may be determined according to loads of PUCCH resources capable of supporting UCI transmission. Alternatively, a maximum PUCCH resource corresponding to a maximum supportable load, namely a PUCCH format4 resource corresponding to CSI, is selected.

A fixed resource may be taken as a PUCCH resource for UCI transmission. Alternatively, a PUCCH format 4 resource corresponding to CSI is selected.

A PUCCH format for UCI transmission is determined, and then a PUCCH resource corresponding to the PUCCH format for UCI transmission is determined. Alternatively, a maximum supportable load corresponding to a PUCCH format 4 is maximum, so that the PUCCH format 4 is selected as a PUCCH format for simultaneously transmitting HARQ-ACK and CSI. The format corresponds to one PUCCH resource, so that the PUCCH format 4 resource corresponding to CSI is selected to send HARQ-ACK and CSI, wherein CSI and HARQ-ACK are jointly coded, and HARQ-ACK is located at a fixed position.

Alternative Embodiment 2.3.8

It is assumed that a PUCCH format 1a/1b resource is used for HARQ-ACK transmission. It is assumed that a PUCCH format3 resource is used for CSI transmission, and parameters for simultaneously transmitting HARQ-ACK information and CSI configured by a high layer are true, so that a PUCCH format for UCI transmission during simultaneous transmission of HARQ-ACK information and CSI is {PUCCH format3 resource corresponding to CSI, PUCCH format 1a/1b resource corresponding to HARQ-ACK}.

A PUCCH resource for UCI transmission may be determined according to loads of PUCCH resources capable of supporting UCI transmission. Alternatively, a maximum PUCCH resource corresponding to a maximum supportable load, namely a PUCCH format3 resource corresponding to CSI, is selected.

A fixed resource may be taken as a PUCCH resource for UCI transmission. Alternatively, a PUCCH format3 resource corresponding to CSI is selected.

A PUCCH format for UCI transmission is determined at first, and then a PUCCH resource corresponding to the PUCCH format for UCI transmission is determined. Alternatively, a maximum supportable load corresponding to a PUCCH format 3 is maximum, so that the PUCCH format 3 is selected as a PUCCH format for simultaneously transmitting HARQ-ACK and CSI. The format corresponds to one PUCCH resource, so that the PUCCH format3 resource corresponding to CSI is selected to send HARQ-ACK and CSI, wherein CSI and HARQ-ACK are jointly coded, and HARQ-ACK is located at a fixed position. When a PUCCH format 3 adopts a single RM, the length of an input sequence of the RM is 13, wherein HARQ-ACK is located at $12^{th}$ and $13^{th}$ bits. When a PUCCH format 3 adopts dual RMs, the length of an input sequence of the first or second RM is 13, wherein 2 bit HARQ-ACK is located at $12^{th}$ and $13^{th}$ bits. Or, the length of an input sequence of the first or second RM is 12, wherein 2 bit HARQ-ACK is located at the $12^{th}$ bit of each RM respectively. In the above-mentioned embodiment, if an SR is also required to be sent simultaneously, the SR is cascaded with HARQ-ACK/CSI and then processed in manners as shown in the alternative embodiments 2.1.2 to 2.2.5.

For non-periodic CSI trigger, the method may further include: aggregated SCs are grouped, and a non-periodic CSI SC set is configured by high-layer signaling based on grouping.

Herein, in the presence of aggregation of 32 SCs, a non-periodic CSI trigger field may be as shown in Table 2.

TABLE 2

| Value of CSI trigger field | Definition |
|---|---|
| '00' | No report of non-periodic CSI trigger |
| '01' | A non-periodic CSI of an SC c is triggered |
| '10' | A non-periodic CSI of a first SC set configured by high-layer signaling is triggered |
| '11' | A non-periodic CSI of a second SC set configured by high-layer signaling is triggered |

Aggregated cells are grouped. Grouping may be or may be not associated with grouping based on a PUCCH. An SC set is configured by high-layer signaling based on the grouping, wherein the sizes of bit strings corresponding to non-periodic CSI trigger fields 10, 11 in the high-layer signaling are 32. During aggregation of 32 SCs, the SCs are divided into two groups. An SC set corresponding to the first group is: a first SC set corresponding to a non-periodic CSI trigger field 10 in a group 1, and a second SC set corresponding to a non-periodic CSI trigger field in a group 1. An SC set corresponding to the second group is: a first SC set corresponding to a non-periodic CSI trigger field 10 in a group 2, and a second SC set corresponding to a non-periodic CSI trigger field in a group 2. Herein, part of SCs in the first SC set corresponding to the group 1 may be overlapped with that in the first SC set corresponding to the group 2. When a resource corresponding to the PUCCH for transmitting the UCI is indicated by an ARI value, the resource corresponding to the PUCCH may be determined according to the latest ARI value, and the determined PUCCH resource is used to send the UCI. The latest ARI may be an ARI in DCI corresponding to last N DAIs, and N is a fixed value for example N=4, or may be configured by a high-layer signaling. Herein, the UCI may contain HARQ-ACK information and CSI information or the UCI may contain HARQ-ACK information.

The embodiment of the disclosure also provides a computer-readable storage medium which stores one or more computer-executable instructions. When the one or more computer-executable instructions are executed, the method for sending UCI is implemented.

Figure 7:
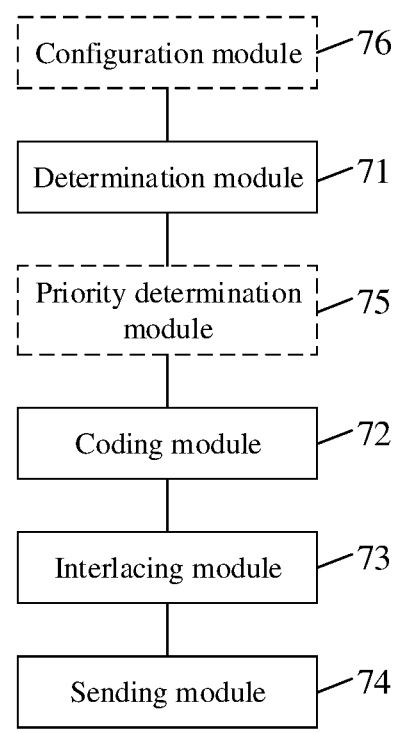
FIG. 7 is a structure diagram of an apparatus for sending UCI according to an embodiment of the disclosure.

The embodiment of the disclosure also provides an apparatus for sending UCI. FIG. 7 is a structure diagram of an apparatus for sending UCI according to an embodiment of the disclosure. As shown in FIG. 7, the apparatus includes a determination module 71, a coding module 72, an interlacing module 73 and a sending module 74.

The determination module 71 is configured to determine UCI required to be sent and priorities of the UCI.

In the embodiment of the disclosure, the UCI may be CSI information or may be CSI information and HARQ-ACK information.

In the embodiment of the disclosure, alternatively, the determination module 71 is configured to determine UCI required to be sent according to at least one of the following rules: UCI required to be sent is determined according to the number of SCs; UCI required to be sent is determined according to the number of bits of UCI; UCI required to be sent is determined according to a PUCCH format capacity; and UCI required to be sent is determined according to a code rate corresponding to UCI.

Alternatively, the operation that the determination module 71 determines UCI required to be sent according to the number of SCs includes: sending, when the number N of SCs with UCI required to be sent is not greater than a preset number X of SCs with UCI available for sending, UCI of N SCs; and sending, when the number N of SCs with UCI required to be sent is greater than a preset number X of SCs with UCI available for sending, UCI of X SCs.

Alternatively, the operation that the determination module 71 determines UCI required to be sent according to the number of bits of UCI includes: sending, when the number of bits M1 of UCI required to be sent is not greater than a preset number of bits Y1 of UCI available for sending, M1-bit UCI; and sending, when the number of bits M1 of UCI required to be sent is greater than a preset number of bits Y1 of UCI available for sending, Y1-bit UCI.

Alternatively, the operation that the determination module 71 determines UCI required to be sent according to a PUCCH format capacity includes: sending, when the number of bits M2 of UCI required to be sent is not greater than a maximum number of bits Y2 carried by a PUCCH format, M2-bit UCI; and sending, when the number of bits M2 of UCI required to be sent is greater than a maximum number of bits Y2 carried by a PUCCH format, Y2-bit UCI.

Alternatively, the operation that the determination module 71 determines UCI required to be sent according to a code rate corresponding to UCI includes: directly sending, when a code rate P corresponding to UCI required to be sent is not greater than a preset code rate Z, the UCI; and deleting, when a code rate P corresponding to UCI required to be sent is greater than a preset code rate Z, part of UCI until the code rate is smaller than the preset code rate Z.

In the embodiment of the disclosure, alternatively, the determination module 71 is configured to: sort, when the UCI is HARQ-ACK information, the UCI according to a DAI field in DCI, the size of the DAI field being configured via high-layer signaling, or the size of the DAI field being a pre-appointed fixed value.

Alternatively, DAI values are ascending sequentially according to an SC index, or ascending sequentially according to an SC attribute at first and then an SC index.

Alternatively, the coding module 72 is configured to code the UCI.

In the embodiment of the disclosure, the operation that the coding module 72 codes the UCI may include: jointly coding the UCI, and independently coding the UCI, wherein joint coding and independent coding are parallel technical solutions without a precedence relationship.

Herein, the operation that the coding module 72 jointly codes the UCI may include: cascading and coding the UCI required to be sent to obtain a UCI coding sequence.

Herein, the operation of cascading the UCI may include: acquiring priorities of the UCI, and cascading the UCI according to an SC index corresponding to the UCI, and/or the type of the UCI, and/or the priorities of the UCI. Alternatively, the UCI is cascaded according to the type of the UCI and then according to the SC index corresponding to the UCI; or, the UCI is cascaded according to the priorities of the UCI and then according to the SC index corresponding to the UCI; or, the UCI is cascaded according to the type of the UCI, according to the priorities of the UCI, and according to the SC index corresponding to the UCI finally.

Alternatively, the coding module 72 is further configured to: add, after the UCI is cascaded, CRC to the cascaded UCI; or, add CRC to the cascaded UCI corresponding to each priority.

Herein, the operation that the coding module 72 independently codes the UCI may include: acquiring priorities of the UCI, and cascading and independently coding the UCI corresponding to each priority to obtain a coding sequence corresponding to each priority.

Alternatively, the coding module 72 determines the length of the coding sequence according to at least one of the following information: the number of bits of the UCI, time frequency resource size occupied by PUCCH format, and a high-layer configuration offset.

In the embodiment of the disclosure, the coding module 72 may be further configured to: add CRC to the cascaded UCI corresponding to each priority.

The interlacing module 73 is configured to: interlace the coded UCI.

The operation that the interlacing module 73 interlaces the coded UCI may include: the interlacing module 73 interlaces the coded UCI in a first interlacing mode; the interlacing module 73 interlaces the coded UCI in a second interlacing mode; and the interlacing module 73 interlaces the coded UCI in a third interlacing mode. When the coding module 72 is configured to jointly code the UCI, the interlacing module 73 may be configured to: interlace in the first interlacing mode; and when coding module 72 is configured to independently code the UCI, the interlacing module 73 may be configured to: interlace in the second interlacing mode and the third interlacing mode.

When the coding module 72 is configured to jointly code the UCI, the interlacing module 73 may be configured to: determine a UCI coding modulation sequence according to a modulation mode corresponding to a PUCCH and a UCI coding sequence, and write the UCI coding modulation sequence into a matrix by row and then column or by column and then row.

When the coding module 72 is configured to independently code the UCI, the interlacing module 73 may be configured to: determine a UCI coding modulation sequence corresponding to each priority according to a modulation mode corresponding to a PUCCH and a coding sequence corresponding to each priority; cascade the coding modulation sequences in a descending order of priorities, and write the cascaded coding modulation sequences into a matrix by row and then column;

or, cascade the coding modulation sequences according to the type of the UCI and then cascade the coding modulation sequences in a descending order of priorities, and write the cascaded coding modulation sequences into a matrix by row and then column.

When the coding module 72 is configured to independently code the UCI, the interlacing module 73 may be configured to: determine a UCI coding modulation sequence corresponding to each priority according to a modulation mode corresponding to a PUCCH and a coding sequence corresponding to each priority; and write the high-priority UCI coding modulation sequences into fixed columns of a matrix, and write the low-priority UCI coding modulation sequences into the matrix by row and then column.

The size of the matrix in the embodiment of the disclosure may be associated with the PUCCH format occupied time frequency resource size.

Alternatively, the sending module 74 is configured to: send the interlaced UCI over a PUCCH.

Alternatively, the sending module 74 is configured to: read out the interlaced UCI from the matrix by column and then row, and send the UCI over the PUCCH.

In the embodiment of the disclosure, alternatively, when the UCI includes HARQ-ACK information and CSI information, the sending module 74 is configured to: determine a PUCCH resource and/or format for sending the UCI, and send the UCI by using the determined PUCCH resource.

Herein, the operation that a PUCCH resource and/or format for sending the UCI is determined and the UCI is sent by using the determined PUCCH resource may include the following operation.

PUCCH resources capable of supporting UCI transmission are determined, a PUCCH resource for UCI transmission is determined according to the PUCCH resources capable of supporting UCI transmission, and the UCI is sent by using the PUCCH resource.

In the embodiment of the disclosure, alternatively, the sending module 74 is configured to: determine PUCCH resources capable of supporting UCI transmission according to at least one of the following rules.

PUCCH resources capable of supporting UCI transmission are determined according to PUCCH resources for HARQ-ACK information transmission. PUCCH resources capable of supporting UCI transmission are determined according to PUCCH resources for CSI transmission. PUCCH resources capable of supporting UCI transmission are determined according to parameters configured by high-layer signaling for supporting simultaneous transmission of HARQ-ACK information and CSI information.

In the embodiment of the disclosure, alternatively, the sending module 74 is configured to: determine a PUCCH resource for UCI transmission according to at least one of the following manners.

A PUCCH resource for UCI transmission is determined at least according to loads of PUCCH resources capable of supporting UCI transmission, or a fixed resource is taken as a PUCCH resource for UCI transmission.

Or, a PUCCH format for UCI transmission is determined, and a PUCCH resource corresponding to the PUCCH format for UCI transmission is determined.

In the embodiment of the disclosure, alternatively, the sending module 74 is configured to: determine a PUCCH resource corresponding to a maximum supportable load in PUCCH resources capable of supporting UCI transmission as a PUCCH resource for UCI transmission;

or, determine a PUCCH resource corresponding to a minimum supportable load in PUCCH resources capable of supporting UCI transmission as a PUCCH resource for UCI transmission;

or, determine a minimum PUCCH resource corresponding to a minimum supportable load smaller than a maximum supportable load value in loads of UCI required to be sent in PUCCH resources capable of supporting UCI transmission as a PUCCH resource for UCI transmission.

Herein, when it is determined that a PUCCH resource for UCI transmission corresponds to more than one PUCCH resource, a PUCCH resource corresponding to HARQ-ACK is selected as a PUCCH resource for UCI transmission, or, a PUCCH resource corresponding to most PRBs is selected as a PUCCH resource for UCI transmission, or, a PUCCH resource corresponding to CSI is selected as a PUCCH resource for UCI transmission.

In the embodiment of the disclosure, alternatively, the fixed resource includes: a PUCCH resource corresponding to HARQ-ACK, or a PUCCH resource corresponding to CSI.

The sending module is configured to: select, when it is determined that a PUCCH resource for UCI transmission corresponds to more than one PUCCH resource, a PUCCH resource corresponding to most PRBs, or, a PUCCH resource corresponding to a minimum supportable load in PUCCH resources corresponding to supportable loads greater than loads of UCI required to be sent; or, select a PUCCH resource corresponding to a maximum supportable load, or, select a PUCCH resource corresponding to a minimum supportable load; or, select a PUCCH resource corresponding to most PRBs.

In the embodiment of the disclosure, alternatively, the sending module 74 is configured to: determine a PUCCH format for UCI transmission, and determine a PUCCH resource corresponding to the PUCCH format for UCI transmission.

The PUCCH format for UCI transmission includes: a PUCCH format capable of carrying UCI with the most bits in PUCCH formats capable of supporting UCI transmission; or, a PUCCH format corresponding to HARQ-ACK; or, a PUCCH format corresponding to CSI.

In the embodiment of the disclosure, the sending module 74 may be further configured to: take, when the determined PUCCH format for UCI transmission corresponds to a PUCCH resource, the PUCCH resource as a PUCCH resource for UCI transmission; select, when the PUCCH format corresponds to more than one PUCCH resource, a PUCCH resource corresponding to most PRBs as a PUCCH resource corresponding to the PUCCH format; or, select a PUCCH resource corresponding to HARQ-ACK as a PUCCH resource corresponding to the PUCCH format; or, select a maximum PUCCH resource corresponding to a maximum supportable load as a PUCCH resource corresponding to the PUCCH format; or, select a minimum PUCCH resource corresponding to a maximum supportable load as a PUCCH resource corresponding to the PUCCH format.

In the embodiment of the disclosure, alternatively, the sending module 74 is configured to: determine, when resources corresponding to the PUCCH are indicated by ARI values, a resource corresponding to the PUCCH according to the latest ARI value, and send the UCI by using the determined PUCCH resource.

For non-periodic CSI trigger, the apparatus may further include:

a configuration module 76, configured to: group aggregated SCs, and configure a non-periodic CSI SC set by high-layer signaling based on grouping.

In the embodiment of the disclosure, the apparatus may further include:

a priority determination module 75, configured to: obtain priorities of the UCI, wherein when the UCI is CSI information, the CSI information contains two priorities, the priority determination module 75 divides the CSI information into a first class of CSI information and a second class of CSI information, determines the first class of CSI information as first-priority UCI, and determines the second class of CSI information as second-priority UCI, wherein the priority of the first-priority UCI is higher than that of the second-priority UCI, or, the CSI information has the same priority.

Herein, the CSI information may be divided into a first class of CSI information and a second class of CSI information according to the type of CSI information, or may be divided in other division manners according to a practical requirement. For example, the first class of CSI information is CSI information of which the type is 3, 5, 6 and 2a, and the second class of CSI information is other types of CSI information; or, the first class of CSI information is an RI and a PTI, and the second class of CSI information is other CSI information. The above division method is only exemplary, and the embodiment of the disclosure does not limit a CSI information division manner.

When the UCI is CSI information and HARQ-ACK information, the priority determination module 75 may be further configured to: determine that the priority of the HARQ-ACK information is higher than the priorities of all CSI information, or that the priority of the HARQ-ACK information is the same as that of the first class of CSI information.

Implementation functions of a processing module in the apparatus for sending UCI as shown in FIG. 7 may be understood with reference to relevant description of the method for sending UCI. Those skilled in the art may understand that functions of the processing module in the apparatus for sending UCI as shown in FIG. 7 may be implemented by running a program on a processor or may be implemented by means of a logic circuit such as a Central Processing Unit (CPU), a Micro Processor Unit (MPU), a Digital Signal Processor (DSP) or a Field-Programmable Gate Array (FPGA).

In the embodiment of the disclosure, it will be appreciated that the disclosed method and apparatus may be implemented in another manner. The apparatus embodiment described above is only schematic. For example, division of the modules is only division of logical functions, and there may be additional division manners during practical implementation. For example, multiple modules or assemblies may be combined or integrated to another system, or some characteristics may be omitted or may be not executed. In addition, coupling or direct coupling or communication connection between displayed or discussed components may be indirect coupling or communication connection, implemented through some interfaces, of the devices or the modules, and may be electrical and mechanical or adopt other forms.

The above-mentioned modules described as separate parts may or may not be physically separated, and parts displayed as modules may or may not be physical modules, and namely may be located in the same place, or may also be distributed to multiple network modules. Part or all of the modules may be selected to achieve the purpose of the solutions of the embodiment according to a practical requirement.

In addition, each function module in each embodiment of the disclosure may be integrated into a processing module, each module may also exist independently, and two or more than two modules may also be integrated into a module. The integrated module may be implemented in a hardware form, and may also be implemented in form of hardware and software function module.

Those of ordinary skill in the art may understand that all or some steps in the above-mentioned method embodiment may be completed by instructing relevant hardware via a program, the program may be stored in a computer-readable storage medium, during execution of the program, the execution includes the steps in the above-mentioned method embodiment, and the storage medium includes: various media capable of storing program codes such as a mobile storage device, a Read-Only Memory (ROM), a magnetic disk or an optical disk.

Alternatively, if being implemented in a form of software function module and sold or used as an independent product, the integrated module mentioned above in the embodiment of the disclosure may be stored in a computer-readable storage medium. Based on this understanding, the technical solutions of the embodiments of the disclosure may be substantially embodied in a form of software product or parts contributing to the related art may be embodied in a form of software product, and the computer software product is stored in a storage medium, including a plurality of instructions enabling a computer device (may be a personal computer, a server or a network device) to execute all or some of the methods according to each embodiment of the disclosure. The storage medium includes: various media capable of storing program codes such as a mobile storage device, an ROM, a magnetic disk or an optical disk.

Those of ordinary skill in the art may understand that all or some of the steps in the above-mentioned embodiment may be implemented by using a computer program flow. The computer program may be stored in a computer-readable storage medium. The computer program is executed on a corresponding hardware platform (such as system, device, apparatus, instrument and processor). During execution, the computer program includes one of the steps of the method embodiment or a combination thereof.

Alternatively, all or some of the steps in the above-mentioned embodiment may also be implemented by using an integrated circuit. These steps may be manufactured into integrated circuit modules respectively, or multiple modules or steps therein are manufactured into a single integrated circuit module.

The apparatus/function module/function unit in the above-mentioned embodiment may be implemented by using a general computation apparatus. They may be centralized on a single computation apparatus or may be distributed on a network composed of multiple computation apparatuses.

When being implemented in a form of software function module and sold or used as an independent product, the apparatus/function module/function unit in the above-mentioned embodiment may be stored in a computer-readable storage medium. The above-mentioned computer-readable storage medium may be a read-only memory, a magnetic disk or an optical disk.

Those of ordinary skill in the art may understand that the technical solutions of the present application may be modified or equivalently replaced without departing from the spirit and scope of the technical solutions of the present application. The scope of protection of the present application is determined by the scope defined by claims.

INDUSTRIAL APPLICABILITY

The method for sending UCI provided in the embodiments of the disclosure includes: determining UCI required to be sent; coding the UCI; interlacing the coded UCI; and sending the interlaced UCI over a PUCCH. Thus, the problem about sending UCI during aggregation of more than five SCs can be solved.

The invention claimed is:

1. A method for sending Uplink Control Information (UCI), comprising:
   determining UCI required to be sent;
   coding the UCI;
   interlacing the coded UCI; and
   sending the interlaced UCI over a Physical Uplink Control Channel (PUCCH), wherein determining UCI required to be sent comprises: determining UCI required to be sent according to a code rate corresponding to UCI, and wherein determining UCI required to be sent according to a code rate corresponding to UCI comprises:
   directly sending, when a code rate P corresponding to UCI required to be sent is not greater than a preset code rate Z, the UCI; and
   deleting, when a code rate P corresponding to UCI required to be sent is greater than a preset code rate Z, part of UCI with low priority until the code rate is smaller than the preset code rate Z.

2. The method according to claim 1, wherein determining UCI required to be sent further comprises determining UCI required to be sent according to the number of Serving Cells (SCs), wherein determining UCI required to be sent according to the number of SCs comprises:
   sending, when the number N of SCs with UCI required to be sent is not greater than a preset number X of SCs with UCI available for sending, UCI of N SCs; and
   sending, when the number N of SCs with UCI required to be sent is greater than a preset number X of SCs with UCI available for sending, UCI of X SCs.

3. The method according to claim 1, wherein determining UCI required to be sent further comprises determining UCI required to be sent according to a number of bits of UCI, wherein determining UCI required to be sent according to the number of bits of UCI comprises:
   sending, when the number of bits M1 of UCI required to be sent is not greater than a preset number of bits Y1 of UCI available for sending, M1-bit UCI; and
   sending, when the number of bits M1 of UCI required to be sent is greater than a preset number of bits Y1 of UCI available for sending, Y1-bit UCI.

4. The method according to claim 1, wherein coding the UCI comprises:
   cascading the UCI required to be sent and coding the cascaded USI to obtain a UCI coding sequence.

5. The method according to claim 4, further comprising:
acquiring priorities of the UCI,
wherein cascading the UCI comprises:
cascading the UCI according to an SC index corresponding to the UCI, and/or the type of the UCI, and/or the priorities of the UCI,
wherein cascading the UCI according to an SC index corresponding to the UCI, and/or the type of the UCI and/or the priorities of the UCI comprises:
cascading the UCI according to the type of the UCI and then according to the SC index corresponding to the UCI; or,
cascading the UCI according to the priorities of the UCI and then according to the SC index corresponding to the UCI; or,
cascading the UCI according to the type of the UCI, according to the priorities of the UCI, and then according to the SC index corresponding to the UCI.

6. The method according to claim 5, after cascading the UCI, the method further comprising:
adding Cyclic Redundancy Check (CRC) to the cascaded UCI; or, adding CRC to the cascaded UCI corresponding to each of the priorities.

7. The method according to claim 1, wherein sending the interlaced UCI over a PUCCH comprises:
reading out the interlaced UCI from a matrix by column and then row, and sending the UCI over the PUCCH.

8. The method according to claim 1, wherein the UCI is Channel Status Indicator (CSI) information or is CSI information and HARQ-ACK information, and wherein the CSI information is Channel Quality Indicator (CQI).

9. The method according to claim 8, further comprising:
determining priorities of the UCI, comprising:
dividing the CSI information containing two priorities into a first class of CSI information and a second class of CSI information, determining the first class of CSI information as first-priority UCI, and determining the second class of CSI information as second-priority UCI, wherein the priority of the first-priority UCI is higher than that of the second-priority UCI,
or, the CSI information has the same priority,
wherein when the UCI is CSI information and HARQ-ACK information, determining priorities of the UCI further comprises:
determining that the priority of the HARQ-ACK information is higher than the priorities of all CSI information, or that the priority of the HARQ-ACK information is the same as that of the first class of CSI information.

10. The method according to claim 1, wherein when the UCI comprises HARQ-ACK information and CSI information, sending the interlaced UCI over the PUCCH comprises:
determining a PUCCH resource for sending the UCI, and sending the UCI by using the determined PUCCH resource,
wherein the step of determining the PUCCH resource for sending the UCI and sending the UCI by using the determined PUCCH resource comprises:
determining PUCCH resources capable of supporting UCI transmission, determining a PUCCH resource for UCI transmission according to the PUCCH resources capable of supporting UCI transmission, and sending the UCI by using the PUCCH resource.

11. The method according to claim 10, wherein determining PUCCH resources capable of supporting UCI transmission comprises:
determining PUCCH resources capable of supporting UCI transmission according to at least one of the following rules:
determining PUCCH resources capable of supporting UCI transmission according to PUCCH resources for HARQ-ACK information transmission;
determining PUCCH resources capable of supporting UCI transmission according to PUCCH resources for CSI transmission; and
determining PUCCH resources capable of supporting UCI transmission according to parameters configured by high-layer signaling for supporting simultaneous transmission of HARQ-ACK information and CSI information.

12. The method according to claim 11, wherein determining a PUCCH resource for UCI transmission according to loads of PUCCH resources capable of supporting UCI transmission comprises:
determining a PUCCH resource corresponding to a maximum supportable load in PUCCH resources capable of supporting UCI transmission as a PUCCH resource for UCI transmission;
or, determining a PUCCH resource corresponding to a minimum supportable load in PUCCH resources capable of supporting UCI transmission as a PUCCH resource for UCI transmission;
or, determining a minimum PUCCH resource corresponding to a minimum supportable load smaller than a maximum supportable load value in loads of UCI required to be sent in PUCCH resources capable of supporting UCI transmission as a PUCCH resource for UCI transmission,
wherein when it is determined that a PUCCH resource for UCI transmission corresponds to more than one PUCCH resource, a PUCCH resource corresponding to HARQ-ACK is selected as a PUCCH resource for UCI transmission, or, a PUCCH resource corresponding to most Physical Resource Blocks (PRBs) is selected as a PUCCH resource for UCI transmission, or, a PUCCH resource corresponding to CSI is selected as a PUCCH resource for UCI transmission.

13. The method according to claim 11, wherein the fixed resource comprises:
a PUCCH resource corresponding to HARQ-ACK, or a PUCCH resource corresponding to CSI,
wherein when it is determined that a PUCCH resource for UCI transmission corresponds to more than one PUCCH resource, a PUCCH resource corresponding to most PRBs is selected as a PUCCH resource for UCI transmission, or, a PUCCH resource corresponding to a minimum supportable load in PUCCH resources corresponding to supportable loads greater than loads of UCI required to be sent is selected as a PUCCH resource for UCI transmission; or, a PUCCH resource corresponding to a maximum supportable load is selected as a PUCCH resource for UCI transmission, or, a PUCCH resource corresponding to a minimum supportable load is selected as a PUCCH resource for UCI transmission; or, a PUCCH resource corresponding to most PRBs is selected as a PUCCH resource for UCI transmission.

14. The method according to claim 11, wherein determining PUCCH resources capable of supporting UCI transmission comprises:
   determining a PUCCH format for UCI transmission, and determining a PUCCH resource corresponding to the PUCCH format for UCI transmission,
   the PUCCH format for UCI transmission comprising: a PUCCH format capable of carrying UCI with most bits in PUCCH formats capable of supporting UCI transmission; or, a PUCCH format corresponding to HARQ-ACK; or, a PUCCH format corresponding to CSI.

15. The method according to claim 14, further comprising:
   taking, when the determined PUCCH format for UCI transmission corresponds to a PUCCH resource, the PUCCH resource as a PUCCH resource for UCI transmission; and
   selecting, when the PUCCH format corresponds to more than one PUCCH resource, a PUCCH resource corresponding to most PRBs as a PUCCH resource corresponding to the PUCCH format; or, select a PUCCH resource corresponding to HARQ-ACK as a PUCCH resource corresponding to the PUCCH format; or, select a maximum PUCCH resource corresponding to a maximum supportable load as a PUCCH resource corresponding to the PUCCH format; or, select a minimum PUCCH resource corresponding to a maximum supportable load as a PUCCH resource corresponding to the PUCCH format.

16. The method according to claim 10, wherein determining a PUCCH resource for UCI transmission comprises:
   determining a PUCCH resource for UCI transmission according to at least one of the following manners:
   determining a PUCCH resource for UCI transmission at least according to loads of PUCCH resources capable of supporting UCI transmission, or taking a fixed resource as a PUCCH resource for UCI transmission;
   or, determining a PUCCH format for UCI transmission, and determining a PUCCH resource corresponding to the PUCCH format for UCI transmission.

17. The method according to claim 1, wherein sending the interlaced UCI over the PUCCH comprises:
   determining, when resources corresponding to the PUCCH are indicated by ACK/NACK Resource Indicator (ARI) values, a resource corresponding to the PUCCH according to the latest ARI value, and sending the UCI by using the determined PUCCH resource.

18. The method according to claim 1, wherein determining UCI required to be sent further comprises determining UCI required to be sent according to a PUCCH format capacity.

19. An apparatus for sending Uplink Control Information (UCI), comprising: a determination module, a coding module, an interlacing module and a sending module, wherein
   the determination module is configured to determine UCI required to be sent;
   the coding module is configured to code the UCI;
   the interlacing module is configured to interlace the coded UCI; and
   the sending module is configured to send the interlaced UCI over a Physical Uplink Control Channel (PUCCH),
   wherein the determination module is configured to: determine UCI required to be sent according to a code rate corresponding to UCI, and the determination module is further configured to: directly send, when a code rate P corresponding to UCI required to be sent is not greater than a preset code rate Z, the UCI; and delete, when a code rate P corresponding to UCI required to be sent is greater than a preset code rate Z, part of UCI with low priority until the code rate is smaller than the preset code rate Z.

20. The apparatus according to claim 19, wherein the determination module is configured to
   determine UCI required to be sent according to the number of Serving Cells (SCs);
   determine UCI required to be sent according to the number of bits of UCI; and/or
   determine UCI required to be sent according to a PUCCH format capacity.

* * * * *